(12) United States Patent
Grillo et al.

(10) Patent No.: US 7,291,437 B2
(45) Date of Patent: Nov. 6, 2007

(54) TONER PROCESSES

(75) Inventors: Amy A. Grillo, Rochester, NY (US); Peter V. Nguyen, Webster, NY (US); Donald Riley, Rochester, NY (US); Allan K. Chen, Oakville (CA); Emily L. Moore, Mississauga (CA); Tie Hwee Ng, Mississauga (CA); Chieh-Min Cheng, Rochester, NY (US)

(73) Assignee: Xerox Corporation, Stamford, CT (US)

(*) Notice: Subject to any disclaimer, the term of this patent is extended or adjusted under 35 U.S.C. 154(b) by 171 days.

(21) Appl. No.: 10/413,633

(22) Filed: Apr. 14, 2003

(65) Prior Publication Data

US 2004/0202952 A1  Oct. 14, 2004

(51) Int. Cl.
*G03G 9/08* (2006.01)
*C08J 3/215* (2006.01)
(52) U.S. Cl. .................... 430/137.14; 523/335
(58) Field of Classification Search ........... 430/137.14; 523/335, 333
See application file for complete search history.

(56) References Cited

U.S. PATENT DOCUMENTS

| | | | |
|---|---|---|---|
| 5,405,728 A * | 4/1995 | Hopper et al. ......... | 430/137.14 |
| 5,482,812 A | 1/1996 | Hopper et al. ............. | 430/137 |
| 5,622,806 A | 4/1997 | Veregin et al. ............. | 430/137 |
| 5,910,387 A | 6/1999 | Mychajlowskij et al. ... | 430/110 |
| 5,916,725 A | 6/1999 | Patel et al. ................. | 430/137 |
| 5,919,595 A | 7/1999 | Mychajlowskij et al. ... | 430/137 |
| 5,922,501 A | 7/1999 | Cheng et al. .............. | 430/137 |
| 5,925,488 A | 7/1999 | Patel et al. ................. | 430/137 |
| 5,945,245 A | 8/1999 | Mychajlowskij et al. ... | 430/137 |
| 5,977,210 A | 11/1999 | Patel et al. ................. | 523/161 |
| 5,994,020 A | 11/1999 | Patel et al. ................. | 430/137 |
| 6,132,924 A * | 10/2000 | Patel et al. ............ | 430/137.14 |
| 6,268,102 B1 | 7/2001 | Hopper et al. ......... | 430/137.14 |
| 6,416,920 B1 | 7/2002 | Hopper et al. ......... | 430/137.14 |
| 6,455,219 B1 * | 9/2002 | Chen et al. ............ | 430/137.14 |
| 2004/0162373 A1 * | 8/2004 | Cheng et al. .......... | 430/137.14 |

OTHER PUBLICATIONS

Diamond, Arthur S. & David S. Weiss (editors) Handbook of Imaging Materials, 2nd ed. New York: Marcel-Dekker, Inc. (2002) p. 182.*

* cited by examiner

*Primary Examiner*—Christopher D. RoDee
(74) *Attorney, Agent, or Firm*—Eugene O. Palazzo; Fay Sharpe LLP

(57) ABSTRACT

A toner process comprising mixing a colorant dispersion with a latex, a wax dispersion, and a coagulant, and wherein the polymer latex selected possesses a weight average molecular weight of from about 20,000 to about 55,000, a number average molecular weight of from about 5,000 to about 18,000, an onset glass transition temperature Tg of from about 40° C. to about 80° C., and a particle size distribution PSD of from about 50 to about 500 nanometers.

37 Claims, No Drawings

TONER PROCESSES

RELATED APPLICATIONS AND PATENTS

Illustrated in copending application U.S. Ser. No. 10/413,603, filed concurrently herewith on Toner Processes, is a toner process comprising mixing a colorant dispersion with a latex, a wax dispersion, and a coagulant, and wherein the polymer present in the latex possesses a gel content of from about 0.5 to about 4.5 weight percent, a polymer melt flow index (MFI) of from about 20 to about 45 grams/10 minutes at about from about 115° C. to about 145° C., the crosslinking molecular weight $M_c$ of the polymer being from about 12,000 to about 200,000, and the crosslinking density $M_e$ of the polymer being from about $1.2 \times 10^{-9}$ to about $2 \times 10^{-7}$/Kmole.

Illustrated in copending application U.S. Ser. No. 10/413.599, filed concurrently herewith on Toner Processes, is a toner process comprising mixing a colorant dispersion with a latex, a wax dispersion, and a coagulant, and wherein the latex contains a polymer with a static yield stress of from about 0.05 to about 3 dyne/cm², a viscosity for the polymer latex of from about 5 to about 35 centipoises (cps), and wherein said toner product possesses a volume average particle size distribution index GSDv of equal to or less than about 1.27, a number average particle size distribution index GSDn of equal to or less than about 1.30, a low number average particle size index $GSDn_{50/16}$ of equal to about or less than about 1.32, and a ratio of the volume average particle size distribution index GSDv to a number average particle size distribution index GSDn of from about 0.93 to about 1.

Illustrated in U.S. Pat. No. 6,638,677 on Toner Processes, filed Mar. 1, 2002 by Raj D. Patel, Valeria M. Farrugia, Daryl Vanbesien, and Edward G. Zwartz, the disclosure of which is totally incorporated herein by reference, is a process comprising heating a latex, a colorant dispersion, a polytetrafluoroethylene dispersion, and an organo metallic complexing component.

Illustrated in U.S. Pat. No. 6,673,505 on Toner Coagulant Processes, filed Mar. 25, 2002 by Lu Jiang, Armin R. Vokel, Chieh-Min Cheng, Michael A. Hopper, Walter Mychajlowskij and Raj D. Patel, the disclosure of which is totally incorporated herein by reference, is a process for the preparation of toner comprising (i) generating or providing a latex emulsion containing resin, water, and an ionic surfactant, and generating or providing a colorant dispersion containing colorant, water, and an ionic surfactant, or a nonionic surfactant;

(ii) blending the latex emulsion with the colorant dispersion;

(iii) adding to the resulting blend a coagulant of a polyamine salt of an acid wherein the salt is of an opposite charge polarity to that of the surfactant latex;

(iv) heating the resulting mixture below or about equal to the glass transition temperature (Tg) of the latex resin;

(v) optionally adding a second latex comprised of resin particles suspended in an aqueous phase resulting in a shell;

(vi) adjusting with a base the pH to about 7 to about 9;

(vii) heating the resulting mixture of (vi) above about the Tg of the latex resin;

(viii) retaining the heating until the fusion or coalescence of resin and colorant is initiated;

(ix) changing the pH of the above (viii) mixture with an acid to arrive at a pH of about 1.5 to about 3.5 to thereby accelerate the fusion or the coalescence and resulting in toner particles comprised of resin, and colorant; and (x) optionally isolating the toner.

Illustrated in U.S. Pat. No. 6,617,092 on Toner Processes, filed Mar. 25, 2002 by Raj D. Patel and Michael A. Hopper, the disclosure of which is totally incorporated herein by reference, is a process for the preparation of a magnetic toner comprising heating a colorant dispersion containing acicular magnetite, a carbon black dispersion, a latex emulsion, and a wax dispersion.

Illustrated in U.S. Pat. No. 6,627,373 on Toner Processes, filed Mar. 25, 2002 by Raj D. Patel and Michael A. Hopper, the disclosure of which is totally incorporated herein by reference, is a process for the preparation of a magnetic toner comprising the heating of a colorant dispersion comprised of a magnetite dispersion, and a carbon black dispersion, and thereafter mixing with a basic cationic latex emulsion and a wax dispersion.

Illustrated in U.S. Pat. No. 6,541,175, filed Feb. 4, 2002 on Toner Processes by Lu Jiang, Walter Mychajlowskij, Guerino G. Sacripante, Raj D. Patel and Michael A. Hopper, the disclosure of which is totally incorporated herein by reference, is a process comprising:

(i) providing or generating an emulsion latex comprised of sodio sulfonated polyester resin particles by heating the particles in water at a temperature of from about 65° C. to about 90° C.;

(ii) adding with shearing to the latex (i) a colorant dispersion comprising from about 20 percent to about 50 percent of a predispersed colorant in water, followed by the addition of an organic or an inorganic acid;

(iii) heating the resulting mixture at a temperature of from about 45° C. to about 65° C. followed by the addition of a water insoluble metal salt or a water insoluble metal oxide thereby releasing metal ions and permitting aggregation and coalescence, optionally resulting in toner particles of from about 2 to about 25 microns in volume average diameter; and optionally (iv) cooling the mixture and isolating the product.

Illustrated in copending application U.S. Ser. No. 10/106,473, Publication No. 20030180648, on Toner Processes, filed Mar. 25, 2002 by Raj D. Patel; Michael A. Hopper, Vladislav Skorokhod, Richard P. N. Veregin, Michael S. Hawkins, and Paul J. Gerroir, the disclosure of which is totally incorporated herein by reference, is a process for the preparation of a toner comprising mixing a colorant dispersion comprising an acicular magnetite dispersion and a carbon black dispersion with a latex, a wax dispersion and a coagulant.

Illustrated in U.S. Pat. No. 6,656,658, filed Mar. 25, 2002 on Magnetite Toner Processes by Raj D. Patel et al., the disclosure of which is totally incorporated herein by reference, is a toner process comprising heating a mixture of an acidified dispersion of an acicular magnetite with a colorant dispersion of carbon black, a wax dispersion, and an acidic latex emulsion.

Illustrated in U.S. Pat. No. 6,656,657, filed Mar. 25, 2002 on Toner Processes by Raj D. Patel et al., the disclosure of which is totally incorporated herein by reference, is a toner process comprising heating an acidified dispersion of an acicular magnetite with an anionic latex, an anionic carbon black dispersion, and an anionic wax dispersion.

Illustrated in U.S. Pat. No. 6,495,302, filed Jun. 11, 2001 on Toner Coagulant Processes by Lu Jiang, Nan-Xing Hu, Raj D. Patel, Walter Mychajlowskij and Michael A. Hopper, the disclosure of which is totally incorporated herein by reference, is a process for the preparation of toner comprising (i) generating a latex emulsion of resin, water, and an ionic surfactant, and a colorant dispersion of a colorant, water, an ionic surfactant, or a nonionic surfactant, and wherein (ii) the latex emulsion is blended with the colorant dispersion;

(iii) adding to the resulting blend containing the latex and colorant a coagulant of a polyaluminum chloride with an opposite charge to that of the ionic surfactant latex colorant;

(iv) heating the resulting mixture below or equal to about the glass transition temperature (Tg) of the latex resin to form aggregates;

(v) optionally adding a second latex comprised of submicron resin particles suspended in an aqueous phase (iv) resulting in a shell or coating wherein the shell is optionally of from about 0.1 to about 1 micron in thickness, and wherein optionally the shell coating is contained on 100 percent of the aggregates;

(vi) adding an organic water soluble or water insoluble chelating component to the aggregates of (v) particles, followed by adding a base to change the resulting toner aggregate mixture from a pH which is initially from about 1.9 to about 3 to a pH of about 5 to about 9;

(vii) heating the resulting aggregate suspension of (vi) above about the Tg of the latex resin;

(viii) optionally retaining the mixture (vii) at a temperature of from about 70° C. to about 95° C.;

(ix) changing the pH of the (viii) mixture by the addition of an acid to arrive at a pH of about 1.7 to about 4; and (x) optionally isolating the toner.

Illustrated in U.S. Pat. No. 6,500,597, filed Aug. 6, 2001 on Toner Coagulant Processes by Raj D. Patel, Lori Rettinger and Michael A. Hopper, the disclosure of which is totally incorporated herein by reference, is a process comprising (i) blending a colorant dispersion of a colorant, water, and an anionic surfactant, or a nonionic surfactant with (ii) a latex emulsion comprised of resin, water, and an ionic surfactant;

(iii) adding to the resulting blend a first coagulant of polyaluminum sulfosilicate (PASS) and a second cationic co-coagulant having an opposite charge polarity to that of the latex surfactant;

(iv) heating the resulting mixture below about the glass transition temperature (Tg) of the latex resin;

(v) adjusting with a base the pH of the resulting toner aggregate mixture from a pH which is in the range of about 1.8 to about 3 to a pH range of about 5 to about 9;

(vi) heating above about the Tg of the latex resin;

(vii) changing the pH of the mixture by the addition of a metal salt to arrive at a pH of from about 2.8 to about 5; and (viii) optionally isolating the product.

Illustrated in U.S. Pat. No. 6,562,541, filed Sep. 24, 2001 on Toner Processes by Daryl Vanbesien, Raj D. Patel, Michael A. Hopper and Stephan D. Drappel, the disclosure of which is totally incorporated herein by reference, is a process for the preparation of toner comprising mixing a latex with a colorant mixture comprised of colorant, an ionic surfactant, and a polytetrafluoroethylene; adding a coagulant; heating the resulting mixture below about the glass transition temperature (Tg) of the latex resin; adding a stabilizer; heating above about the Tg of the latex resin; and optionally isolating the toner.

Illustrated in U.S. Pat. No. 6,576,389, filed Oct. 15, 2001 on Toner Coagulant Processes on Daryl Vanbesien, Raj D. Patel, Michael A. Hopper, David J. Sanders, Kurt I. Halfyard and Danielle C. Boils, the disclosure of which is totally incorporated herein by reference, is a process for the preparation of toner comprising mixing a colorant dispersion, a latex emulsion, a wax dispersion and coagulants comprising a colloidal alumina coated silica, and a polymetal halide.

In U.S. Pat. No. 6,132,924, the disclosure of which is totally incorporated herein by reference, there is illustrated a process for the preparation of toner comprising mixing a colorant, a latex, and two coagulants, followed by aggregation and coalescence, and wherein one of the coagulants may be polyaluminum chloride.

Illustrated in U.S. Pat. No. 5,945,245, the disclosure of which is totally incorporated herein by reference, is a process for the preparation of toner compositions comprising:

(i) preparing an emulsion latex comprised of sodio sulfonated polyester resin particles of from about 5 to about 500 nanometers in size diameter, by heating said resin in water at a temperature of from about 65° C. to about 90° C.;

(ii) preparing a pigment dispersion in water by dispersing in water from about 10 to about 25 weight percent of sodio sulfonated polyester, and from about 1 to about 5 weight percent of pigment;

(iii) adding the pigment dispersion to a latex mixture comprised of sulfonated polyester resin particles in water with shearing, followed by the addition of an alkali halide in water until aggregation results, as indicated by an increase in the latex viscosity of from about 2 centipoise to about 100 centipoise;

(iv) heating the resulting mixture at a temperature of from about 45° C. to about 55° C., thereby causing further aggregation and enabling coalescence, resulting in toner particles of from about 4 to about 9 microns in volume average diameter and with a geometric distribution of less than about 1.3; and optionally (v) cooling the product mixture to about 25° C. and followed by washing and drying.

Also of interest is U.S. Pat. No. 6,416,920, the disclosure of which is totally incorporated herein by reference, which illustrates a process for the preparation of toner comprising mixing a colorant, a latex, and a silica, which silica is coated with an alumina.

The appropriate components, such as for example, waxes, coagulants, resin latexes, surfactants, and colorants, and processes, especially toner emulsion/aggregation processes, of the above copending applications may be selected for the present invention in embodiments thereof.

BACKGROUND

This invention relates to toner processes, and more specifically, to aggregation and coalescence processes. More specifically, the present invention relates in embodiments to latexes, toners, and methods for the preparation of toner compositions by a chemical process, such as emulsion aggregation, wherein, for example, latex particles are aggregated with a colorant, and optional components, such as a wax, and optionally in the presence of a coagulant like a polymetal halide, or alternatively a mixture of coagulants, thereafter coalescing. Yet more specifically, there is provided in accordance with the present invention latex dispersions with desirable characteristics, such as yield stress, viscosity, and the like, and wherein the toner resulting possesses a number of excellent properties, such as particle size, average particle size distribution index, number average particle size and an acceptable ratio of the volume average particle size distribution index, GSDv to number average particle size distribution index, GSDn, and which ratio is, for example, at least equal to or in excess of about 0.95. Moreover, in embodiments of the present invention there are provided polymer latexes with desirable crosslinking characteristics, and which latexes can be selected for the preparation of toners by emulsion/aggregation processes, and further latexes with controlled molecular weights of weight average molecular and number average molecular weights, suitable on set glass transition temperatures, Tg and excellent particle size distribution, PSD.

A number of advantages are associated with the present invention in embodiments thereof including, for example, those illustrated herein; toners that can be selected for oil-less imaging and printing systems, inclusive of color systems such as the Xerox multifunctional DocuCenter Color 500/500 and the 400 CP/320, and wherein removal and stripping of the toner from a fixing roll can be achievable in the absence of an oil; toners that enable suitable surface gloss of a generated developed fixed image, excellent transparency projection, and resistance to image distortion by blending of the image developed; the provision of toners preferably generated by emulsion/aggregation processes and Which toners possess excellent chargability, cleanability, transfer, and enables developed images with minimal background, and wherein the developers with such toners have extended developer lifetimes; excellent hot offset, for example above about 210° C., and more specifically, from about 210° C. to about 230° C.; a fusing latitude of from about 20° C. to about 35° C., wherein fusing latitude refers to a temperature in which, when a developed image is fused, evidences no offset either to the substrate that the image is fused on, referred as "Cold" offset or an offset on the fuser roll referred as the "HOT" offset; a minimum fixing temperature of, for example, about 100° C. to about 180° C.; and in embodiments extended photoreceptor life since the toner fusing temperature can be below about 180° C., such as from about 100° C. to about 180° C., as measured by the known Crease Test.

REFERENCES

In U.S. Pat. No. 6,132,924, the disclosure of which is totally incorporated herein by reference, there is illustrated a process for the preparation of toner comprising mixing a colorant a latex, and a coagulant, followed by aggregation and coalescence, wherein the coagulant may be a polyaluminum chloride.

In U.S. Pat. No. 6,268,102, the disclosure of which is totally incorporated herein by reference, there is illustrated a process for the preparation of toner comprising mixing a colorant a latex, and a coagulant, followed by aggregation and coalescence, wherein the coagulant may be a polyaluminum sulfosilicate.

Illustrated in U.S. Pat. No. 5,994,020, the disclosure of which is totally incorporated herein by reference, are toner preparation processes, and more specifically, a process for the preparation of toner comprising (i) preparing, or providing a colorant dispersion;

(ii) preparing, or providing a functionalized wax dispersion comprised of a functionalized wax contained in a dispersant mixture comprised of a nonionic surfactant, an ionic surfactant, or mixtures thereof;

(iii) shearing the resulting mixture of the functionalized wax dispersion (ii) and the colorant dispersion (i) with a latex or emulsion blend comprised of resin contained in a mixture of an anionic surfactant and a nonionic surfactant;

(iv) heating the resulting sheared blend of (iii) below about the glass transition temperature (Tg) of the resin particles;

(v) optionally adding additional anionic surfactant to the resulting aggregated suspension of (iv) to prevent, or minimize additional particle growth of the resulting electrostatically bound toner size aggregates during coalescence (iv);

(vi) heating the resulting mixture of (v) above about the Tg of the resin; and optionally, (vii) separating the toner particles.

In forming toner compositions for use with reprographic or xerographic print devices, a number of emulsion aggregation processes are known. For example, emulsion/aggregation/coalescing processes for the preparation of toners are illustrated in a number of Xerox patents, the disclosures of which are totally incorporated herein by reference, such as U.S. Pat. No. 5,290,654, U.S. Pat. No. 5,278,020, U.S. Pat. No. 5,308,734, U.S. Pat. No. 5,370,963, U.S. Pat. No. 5,344,738, U.S. Pat. No. 5,403,693, U.S. Pat. No. 5,418,108, U.S. Pat. No. 5,364,729, and U.S. Pat. No. 5,346,797; and also of interest may be U.S. Pat. Nos. 5,348,832; 5,405,728; 5,366,841; 5,496,676; 5,527,658; 5,585,215; 5,650,255; 5,650,256 and 5,501,935; 5,723,253; 5,744,520; 5,763,133; 5,766,818; 5,747,215; 5,827,633; 5,853,944; 5,804,349; 5,840,462; 5,869,215; 5,869,215; 5,863,698; 5,902,710; 5,910,387; 5,916,725; 5,919,595; 5,925,488 and 5,977,210. The components and processes of the Xerox patents can be selected for the present invention in embodiments thereof.

In addition, the following U.S. patents relate to emulsion aggregation toner processes, the disclosures of which is totally incorporated herein by reference.

U.S. Pat. No. 5,922,501 illustrates a process for the preparation of toner comprising blending an aqueous colorant dispersion and a latex resin emulsion, and which latex resin is generated from a dimeric acrylic acid, an oligomer acrylic acid, or mixtures thereof and a monomer; heating the resulting mixture at a temperature about equal, or below about the glass transition temperature (Tg) of the latex resin to form aggregates; heating the resulting aggregates at a temperature about equal to, or above about the Tg of the latex resin to effect coalescence and fusing of the aggregates; and optionally isolating the toner product, washing, and drying.

U.S. Pat. No. 5,945,245 illustrates a surfactant free process for the preparation of toner comprising heating a mixture of an emulsion latex, a colorant, and an organic complexing agent.

U.S. Pat. No. 5,482,812 illustrates a process for the preparation of toner compositions or toner particles comprising (i) providing an aqueous pigment dispersion comprised of a pigment, an ionic surfactant, and optionally a charge control agent; (ii) providing a wax dispersion comprised of wax, a dispersant comprised of nonionic surfactant, ionic surfactant or mixtures thereof; (iii) shearing a mixture of the wax dispersion and the pigment dispersion with a latex or emulsion blend comprised of resin, a counterionic surfactant with a charge polarity of opposite sign to that of the ionic surfactant and a nonionic surfactant; (iv) heating the above sheared blend below about the glass transition temperature (Tg) of the resin to form electrostatically bound toner size aggregates with a narrow particle size distribution; (v) adding additional ionic surfactant to the aggregated suspension of (iv) to ensure that no, or minimal additional particle growth of the electrostatically bound toner size aggregates occurs on further increasing the temperature to coalesce the aggregates into toner particles (vi); (vi) heating the mixture of (v) with bound aggregates above about or at the Tg of the resin; and optionally (vii) separating the toner particles from the aqueous slurry by filtration and thereafter optionally washing.

U.S. Pat. No. 5,622,806 describes a process for the preparation of toner compositions with controlled particle size comprising (i) preparing a pigment dispersion in water, which dispersion is comprised of a pigment, an ionic surfactant in amounts of from about 0.5 to about 10 percent by weight to water, and an optional charge control agent; (ii) shearing the pigment dispersion with a latex mixture comprised of a counterionic surfactant with a charge polarity of opposite sign to that of the ionic surfactant, a nonionic surfactant, and resin particles, thereby causing a flocculation or heterocoagulation of the formed particles of pigment, resin, and charge control agent; and (iii) stirring.

SUMMARY

It is a feature of the present invention to provide latexes, toners, and processes thereof with a number of the advantages illustrated herein.

It is a feature of the present invention to provide latexes, toners, and processes thereof that possess desirable melt fusing, hot offset, and fusing latitude temperatures, and which toners can contain a gel or a crosslinked resin.

It is another feature of the present invention to provide toners prepared by a chemical process, especially the emulsion aggregation process illustrated herein.

In another feature there are disclosed improved latexes and toners with a number of specific desirable characteristics.

EMBODIMENTS

Aspects of the present invention relate to a toner process comprising mixing a colorant dispersion with a latex, a wax dispersion, and a coagulant, and wherein the latex contains a polymer with a static yield stress of from about 0.05 to about 3 dyne/cm$^2$, a viscosity for the polymer latex of from about 5 to about 35 centipoises (cps), and wherein the toner product possesses a volume average particle size distribution index GSDv of equal to or less than about 1.27, a number average particle size distribution index GSDn of equal to or less than about 1.30, a low number average particle size index GSDn$_{50/16}$ of equal to about or less than about 1.32, and a ratio of the volume average particle size distribution index GSDv to a number average particle size distribution index GSDn of from about 0.93 to about 1; a toner process comprising mixing a colorant dispersion with a latex, a wax dispersion, and a coagulant, and wherein the latex contains a polymer with a static yield stress of from about 0.05 to about 3 dyne/cm$^2$, a viscosity for the polymer latex of from about 5 to about 35 centipoises, and wherein the toner product possesses a volume average particle size distribution index GSDv of equal to or less than about 1.27, a number average particle size distribution index GSDn of equal to or less than 1.30, a low number average particle size index GSDn$_{50/16}$ of equal to about or less than about 1.32, and a ratio of the volume average particle size distribution index GSDv to a number average particle size distribution index GSDn of from about 0.93 to about 1, and wherein the viscosity for the polymer latex is at a shear rate of from about 0.1 s$^{-1}$ to about 10 s$^{-1}$ (second) at a solid content of from about 25 to about 75, and which viscosity is at a temperature of from about 23° C. to about 27° C.; a process comprising heating a colorant dispersion with a latex, a wax dispersion, and a coagulant, and wherein the latex contains a polymer with a static yield stress of from about 0.05 to about 3 dyne/cm$^2$, a viscosity for the polymer latex of from about 5 to about 40 centipoises (cps), and wherein the toner product possesses a volume average particle size distribution index GSDv of equal to or less than about 1.27, a number average particle size distribution index GSDn of equal to or less than about 1.30, a low number average particle size index GSDn$_{50/16}$ of equal to about or less than about 1.32, and a ratio of the volume average particle size distribution index GSDv to a number average particle size distribution index GSDn of from about 0.93 to about 1; and wherein the heating comprises a first and second heating, and wherein the second heating is above the temperature of the first heating; a toner process comprising mixing a colorant dispersion with a latex, a wax dispersion, and a coagulant, and wherein the polymer present in the latex possesses a gel content of from about 0.5 to about 4.5 weight percent, a polymer melt flow index (MFI) of from about 20 to about 45 grams/10 minutes at about from about 115° C. to about 145° C., the crosslinking molecular weight M$_c$ of the polymer being from about 12,000 to about 200,000, and the crosslinking density M$_e$ of the polymer being from about 1.2×10$^{-9}$ to about 2×10$^{-7}$/Kmole; a process comprising heating a colorant dispersion with a latex, a wax dispersion, and a coagulant, and wherein the polymer present in the latex possesses a gel content of from about 0.5 to about 5 weight percent, a polymer melt flow index (MFI) of from about 20 to about 45 grams/10 minutes at about from about 115° C. to about 145° C., the crosslinking molecular weight M$_c$ of the polymer being from about 12,000 to about 200,000, and the crosslinking density M$_e$ of the polymer being from about 1.2×10$^{-9}$ to about 2×10$^{-7}$/Kmole; a process comprising heating a colorant dispersion with a latex, a wax dispersion, and a coagulant, and wherein the polymer present in the latex possesses a gel content of from about 0.5 to about 5 weight percent, a polymer melt flow index (MFI) of from about 20 to about 45 grams/10 minutes at about from about 115° C. to about 145° C., the crosslinking molecular weight M$_c$ of the polymer being from about 12,000 to about 200,000, and the crosslinking density M$_e$ of the polymer being from about 1.2×10$^{-9}$ to about 2×10$^{-7}$/Kmole; and wherein the heating comprises a first and second heating, and wherein the second heating is above the temperature of the first heating; a toner process comprising mixing a colorant dispersion with a latex, a wax dispersion, and a coagulant, and wherein the polymer latex selected possesses a weight average molecular weight of from about 20,000 to about 55,000, a number average molecular weight of from about 5,000 to about 18,000, an onset glass transition temperature Tg of from about 40° C. to about 80° C., and a particle size distribution PSD of from about 50 to about 500 nanometers; a process comprising heating a colorant dispersion with a latex, a wax dispersion, and a coagulant, and wherein the polymer latex selected possesses a weight average molecular weight of from about 20,000 to about 55,000, a number average molecular weight of from about 5,000 to about 20,000, an onset glass transition temperature Tg of from about 40° C. to about 80° C.; a process comprising heating a colorant dispersion with a latex, a wax dispersion, and a coagulant, and wherein the polymer latex selected possesses a weight average molecular weight of from about 20,000 to about 55,000, a number average molecular weight of from about 5,000 to about 20,000, an onset glass transition temperature Tg of from about 40° C. to about 80° C.; and wherein the heating comprises a first and second heating, and wherein the second heating is above the temperature of the first heating; a process wherein the weight average molecular weight is from about 25,000 to about 45,000; a process wherein the weight average molecular weight is from about 28,000 to about 40,000; a process wherein the weight average molecular weight is from about 28,000 to about 37,000; a process wherein the number average molecular weight is from about 5,000 to about 20,000; a process wherein the number average molecular weight is from about 6,000 to about 15,000; a process wherein the number average molecular weight is from about 8,000 to about 13,000; latexes containing a polymer with a static yield stress of from about 0.05 to about 3 dyne/cm$^2$, a viscosity for the polymer latex of from about 5 to about 35 centipoises (cps) at a shear rate of, for example, from about 0.1 s$^{-1}$ to about 10 s$^{-1}$ wherein s refers to second, at a solid contents of from about 25 to about 75, and more specifically, from about 30 to about 55; toners with a volume average particle size distribution index GSDv of equal to or less than about 1.27, such as from about 1.10 to about 1.27, a number average particle size distribution index GSDn of equal to or less than 1.30, and more specifically, from about 1.10 to about 1.30, a low number average particle size index GSDn, GSDn,$_{50/16}$ wherein the particle size distribution is measured with a suitable process such as Coulter Counter Multisizer II. The volume average and the number average distribution, respectively, are plotted as a function of the divided regions (channels) from the side of the small particle size (the plot of the particle size distribution is from a small particle size to a large particle size). The particle diameters at which a cumulative percentage of, for example, 16 percent are attained, refer to the volume D16 percent and number D16 percent, respectively; the particle diameters at which a cumulative percentage of 50 percent are attained are defined as volume D50 percent and number D50 percent, respectively, and the particle diameters at which a cumulative percentage of 84 percent are attained are defined as volume D84 percent and number D84 percent, respectively. These aforementioned volume average particle size distribution index GSDv and number average particle size distribution index GSDn can be expressed by using D16 percent, D50 percent, and D84 percent in cumulative distribution, wherein the volume average particle size distribution index GSDv is expressed as (volume D84 percent/volume D16 percent)$^{1/2}$ and the number average particle size distribution index GSDn is expressed as (number D84 percent/number D16 percent)$^{1/2}$, wherein the lower number average particle size index GSDn,$_{50/16}$ is expressed as (number D50 percent/number D16 percent), etc. 50/16 of equal to about or less than about 1.32, and more specifically, from about 1.10 to about 1.32, and a ratio of the volume average particle size distribution index GSDv to a number average particle size distribution index GSDn of equal to or more than from about 0.93, and more specifically, from about 0.93 to about 1, and wherein the rheological indicators of static yield stress, viscosity, and viscosity dependence on shear rate or speed permit the generation of latexes and toners thereof with consistent and preselected properties; toner, preferably generated by emulsion/aggregation processes wherein the polymer present in the latex emulsion possesses a gel content of from about 0.5 to about 4.5 weight percent, that is the polymer crosslinking percentage, is from about 1 to about 3 percent by weight, a polymer melt flow index (MFI) of from about 20 to about 45 grams/10 minutes at about, for example, 130° C. with an about 2.2 Kilogram load force, the crosslinking molecular weight GMC of the polymer being, for example, from about 12,000 to about 200,000, the crosslinking density $M_e$ of the polymer being, for example, from about 1.2×10$^{-9}$ to about 2×10$^{-7}$/Kmol and wherein, for example, the temperature dependence of stripping during oil-less fixing can be surpressed, for example from about 130° C. to about 190° C., thereby permitting toners with excellent surface gloss characteristics of the developed fixed image, bending resistance of the fixed image and a number of the other advantages illustrated herein; imaging processes wherein fused images at 0.35 and 1.05 milligram toner/cm$^2$ were prepared in a free-belt nip fuser on Japanese stock paper at 180 millimeters/second; processes wherein there is generated a gloss for images fused at 180° C. of from about 30 to about 60 Gardner gloss units (ggu) as measured using a gloss meter according to the TAPPI 75° measurement protocol.

Bending resistance can be related to crease area. Crease area is measured by folding paper across the imaged area and creasing with a crease roller. The folded paper is open and the image is rubbed with a cotton ball to remove loose toner. The crease area (CA) is then measured with an Image Analysis system. For an image at 1.05 milligram toner/cm$^2$ latexes illustrated herein in embodiments yield, for example, a crease area of 80 at less than about a 150° C. fusing temperature.

Further aspects of the present invention relate to toners, preferably generated by emulsion/aggregation processes, and wherein the polymer latex selected possesses a weight average molecular weight of from about 20,000 to about 55,000; a number average molecular weight of from about 5,000 to about 18,000 as determined on a Waters GPC, an onset Tg of from about 40° C. to about 80° C., as measured on a Seiko DSC, a particle size distribution PSD of from about 50 to about 500 nanometers, as measured by light scattering technique on a Coulter N4 Plus Particle Sizer, and thereby enabling, for example, excellent surface gloss of the fixed developed images and a number of the other advantages illustrated herein; toner processes comprising the mixing and aggregation of toner resin and colorant by heating the mixture about below the glass transition, Tg, temperature of the resin, heating the resulting mixture above about the Tg of the resin and cooling, and wherein in embodiments there can be selected for the toner processes surfactants, coagulants, known toner additives, pH controlling agents, as illustrated in the Xerox U.S. aggregation/emulsion patents and processes illustrated herein, the disclosures of each of these patents having been totally incorporated herein by reference; toner processes comprising the controlled aggregation of finely divided and chemically dispersed polymer latex, colorant like a pigment, wax, coagulants, such as a polymetal halide, additives such as silica, and heating at a first resin glass transition temperature, such as 40° C., followed by heating at a second resin Tg, for example of 90° C., to enable coalescence then adjusting the pH, and more specifically, lowering the pH from about 9 to about 5 to about 6.5 by the addition of an acid, and thereafter, cooling to about room temperature, for example from about 23° C. to about 30° C., once the particles are of the size and shape desired; washing and drying; a toner process wherein the colorant dispersion contains an anionic surfactant; a process wherein the colorant is carbon black, and wherein the carbon black dispersion comprises carbon black particles dispersed in water and an anionic surfactant, and wherein the colorant is present in an amount of from about 4 to about 10 weight percent; a process wherein the amount of colorant selected is from about 2 to about 12 percent by weight of toner, and the coagulant is comprised of a first coagulant of a polymetal halide present in an amount of about 0.02 to about 2 percent by weight of toner, and a further second cationic surfactant coagulant present in an amount of about 0.1 to about 5 percent by weight of toner; a process wherein the amount of coagulant, which coagulant is a polymetal halide, is selected in an amount of about 0.05 to about 0.15 percent by weight of toner; a process wherein the toner possesses a minimum fix temperature (MFT) of about 100° C. to about 180° C.; a process wherein the toner hot offset temperature (HOT) is from about 195° C. to about 250° C.; a process wherein the colorant dispersion is obtained by ball milling, attrition, polytroning or media milling with an anionic surfactant resulting in colorant particles suspended in water containing the anionic surfactant; a process wherein the colorant is carbon black, and the amount of the carbon black dispersion is from about 3 to about 10 percent by weight of toner; a process wherein the polymer latex contains a crosslinked resin of from about 0.15 to about 0.4 micron in volume average diameter; a process wherein the pigment size is from about 0.6 micron to about 0.1 micron in average volume diameter, and the pigment is carbon black; a process wherein the acid is nitric, sulfuric, hydrochloric, citric or acetic acid, and the coagulant is comprised of a coagulant of a polyaluminum chloride; a process wherein the base is selected from the group consisting of sodium hydroxide, potassium hydroxide, and ammonium hydroxide, and wherein the coagulant is comprised of a polyaluminum halide; a process wherein there is added to the formed toner aggregates a second latex comprised of submicron resin particles suspended in an aqueous phase containing an anionic surfactant, and wherein the second latex is selected in an amount of from about 10 to about 40 percent by weight of the initial latex (i) to form a shell thereover on the formed aggregates, and which shell is of an optional thickness of about 0.2 to about 0.8 micron, and wherein the coagulant is a polymetal halide; a process wherein the added latex contains the same resin as the initial latex of (i), or wherein the added latex contains a dissimilar resin than that of the initial latex; a process wherein the pH of the mixture resulting is increased from about 2 to about 2.6 to about 6.5 to about 7.5, and wherein the base functions primarily as a stabilizer for the aggregates during coalescence, and no or minimal toner particle size increase results, and wherein the coagulant is a polymetal halide; a process wherein the temperature at which toner sized aggregates are formed controls the size of the aggregates, and wherein the final toner size is from about 3 to about 15 microns in volume average diameter; a process wherein the aggregation temperature is from about 45OC to about 60° C., and wherein the coalescence or fusion temperature is from about 80° C. to about 95° C., and wherein the coagulant is a polyaluminum halide; a process wherein the time of coalescence or fusion is from about 6 to about 12 hours, and wherein the toner resulting possesses a smooth morphology; a process wherein the latex contains a resin with the characteristics illustrated herein and selected from the group comprised of poly (styrene-alkyl acrylate), poly(styrene-1,3-diene), poly(styrene-alkyl methacrylate), poly(alkyl methacrylate-alkyl acrylate), poly(alkyl methacrylate-aryl acrylate), poly(aryl methacrylate-alkyl acrylate), poly(alkyl methacrylate), poly (styrene-alkyl acrylate-acrylonitrile), poly(styrene-1,3-diene-acrylonitrile), poly(alkyl acrylate-acrylonitrile), poly (styrene-butadiene), poly(methylstyrene-butadiene), poly (methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly (propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly (styrene-butyl acrylate), poly(styrene-butadiene-acrylonitrile), and poly(styrene-butyl acrylate-acrylononitrile); a process wherein a crosslinking component monomer is added to the resin to provide a latex resin free of crosslinking, and wherein the monomer is optionally selected in an amount of from about 0.5 to about 15 percent by weight; a process wherein the latex contains a resin or polymer selected from the group consisting of poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly (styrene-1,3-diene-acrylonitrile-acrylic acid), and poly(alkyl acrylate-acrylonitrile-acrylic acid), and wherein the coagulant is a polymetal halide; a process wherein there is further included a second coagulant of a cationic surfactant coagulant; a process wherein the coagulant is a polymetal halide polyaluminum chloride, and wherein the cationic coagulant is an alkylbenzyl dimethyl ammonium chloride; a process wherein the coagulant is polymetal halide of a polyaluminum chloride, a polyaluminum sulfosilicate, or a polyaluminum sulfate, and there is further added to the mixture a second cationic surfactant coagulant of an alkylbenzyl dimethyl ammonium chloride; a process wherein the wax dispersion contains a polyethylene wax, water, and an anionic surfactant, and wherein the wax is selected in an amount of from about 5 to about 20 weight percent; a process wherein the wax dispersion contains a polypropylene wax, water, and an anionic surfactant, and wherein the wax is selected in an amount of from about 5 to about 20 weight percent; a process wherein the second coagulant is selected from the group comprised of alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, and cetyl pyridinium bromide present in the amount of about 0.1 to about 5 percent by weight of toner; a process wherein the colorant dispersion is a cyan, a magenta, a yellow, a black or mixtures thereof; a process wherein the coagulant is comprised of a mixture of coagulants of a polymetal halide, and a second cationic coagulant wherein the first coagulant is present in the amount of about 0.02 to about 0.2 percent by weight of toner, and the second coagulant is present in the amount of about 0.05 to about 2 percent by weight of toner; a process wherein the crosslinked resin is poly(styrene butylacrylate, beta carboxy ethyl acrylate divinyl benzene); a process wherein the resin possesses a molecular weight $M_w$ of about 20,000 to about 500,000, and an onset glass transition (Tg) temperature of from about 45° C. to about 55° C.; a process wherein the resulting toner possesses a shape factor of from about 110 to about 148; a process wherein the coagulant is a polymetal halide present in an amount of about 0.02 to about 0.2 percent by weight of toner; a process where the coagulant is a cationic surfactant present in the amount of about 0.1 to about 2 percent by weight of toner; a process wherein the toner possesses a minimum fix temperature (MFT) of about 100° C. to about 180° C.; a process wherein the toner hot offset temperature (HOT) is from about 195° C. to about 250° C.; a process wherein the amount of the colorant dispersion is from about 4 to about 8 percent by weight of toner; a process wherein the base is selected from the group consisting of sodium hydroxide, potassium hydroxide, and ammonium hydroxide, and wherein the coagulant is a polymetal halide; a process wherein there is added to the formed toner aggregates a second latex comprised of submicron resin particles suspended in an aqueous phase containing an anionic surfactant, and wherein the second latex is selected in an amount of from about 10 to about 40 percent by weight of the initial latex and wherein the coagulant is a polymetal halide; a process wherein the base functions primarily as a stabilizer for the aggregates during coalescence and no or minimal toner particle size increase results, and wherein the coagulant is a polymetal halide, a process wherein the temperature at which toner sized aggregates are formed controls the size of the aggregates, and wherein the final toner size is from about 2 to about 25 microns in volume average diameter; a process wherein the aggregation temperature is from about 45° C. to about 65° C., wherein the coalescence or fusion temperature is from about 80° C. to about 95° C., and wherein the coagulant is a polymetal halide; a process wherein the time of coalescence or fusion is from about 5 to about 12 hours, and wherein the toner resulting possesses a smooth morphology; a process wherein the latex contains a noncrosslinked resin or polymer selected from the group consisting of poly(styrene-alkyl acrylate), poly(styrene-1,3-diene), poly(styrene-alkyl methacrylate), poly(alkyl methacrylate-alkyl acrylate), poly(alkyl methacrylate-aryl acrylate), poly(aryl methacrylate-alkyl acrylate), poly(alkyl methacrylate), poly(styrene-alkyl acrylate-acrylonitrile), poly(styrene-1,3-diene-acrylonitrile), poly(alkyl acrylate-acrylonitrile), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly (ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly (styrene-propyl acrylate), poly(styrene-butyl acrylate), poly (styrene-butadiene-acrylonitrile); a process wherein the aggregate mixture pH value is about 6.5 to about 7.5 obtained by the addition of a base like sodium hydroxide; a toner process wherein the heating involves a first heating and subsequently a second heating, and which second heating is at a higher temperature than the first heating; a process wherein the time of coalescence or fusion is from about 10 to about 12 hours, and wherein the toner particles possess a smooth morphology; a process for preparing a chemical toner wherein the blending and aggregation are performed at a pH of about 2 to about 3 or about 2 to about 2.8, while the coalescence is initially conducted at a pH of about 7 to about 8 followed by a reduction in pH to about 5.5 to about 6.5, and followed by further heating for a period of hours, for example, about 6 to about 12 hours.

Illustrative examples of resin particles selected for the process of the present invention include known polymers selected, for example, from the group consisting of poly (styrene-alkyl acrylate), poly(styrene-1,3-diene), poly(styrene-alkyl methacrylate), poly(alkyl methacrylate-alkyl acrylate), poly(alkyl methacrylate-aryl acrylate), poly(aryl methacrylate-alkyl acrylate), poly(alkyl methacrylate), poly (styrene-alkyl acrylate-acrylonitrile), poly(styrene-1,3-diene-acrylonitrile), poly(alkyl acrylate-acrylonitrile), poly (styrene-butadiene), poly(methylstyrene-butadiene), poly (methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly (propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly (styrene-butyl acrylate), poly(styrene-butadiene-acrylonitrile), poly(styrene-butyl acrylate-acrylononitrile), polymers containing carboxylic acid; wherein the carboxylic acid is, for example, selected from a group of acrylic acid, methacrylic acid, itaconic acid, or beta carboxy ethyl acrylate.

The resin particles selected for the process of the present invention can be prepared by, for example, emulsion polymerization techniques, including semicontinuous emulsion polymerization methods, and the monomers utilized in such processes can be selected from, for example, styrene, acrylates, methacrylates, butadiene, isoprene, acrylonitrile; monomers comprised of an A and a B monomer wherein from about 75 to about 95 percent of A and from about 5 to about 30 percent of B is selected, wherein A can be, for example, styrene, and B can be, for example, an acrylate, methacrylate, butadiene, isoprene, or an acrylonitrile; and optionally, acid or basic olefinic monomers, such as acrylic acid, methacrylic acid, beta carboxy ethyl acrylate, acrylamide, methacrylamide, quaternary ammonium halide of dialkyl or trialkyl acrylamides or methacrylamide, vinylpyridine, vinylpyrrolidone, vinyl-N-methylpyridinium chloride and the like. The presence of acid or basic groups in the monomer or polymer resin is optional, and such groups can be present in various amounts of from about 0.1 to about 10 percent by weight of the polymer resin. Chain transfer agents, such as dodecanethiol or carbon tetrabromide, can also be selected when preparing resin particles by emulsion polymerization. Other processes of obtaining resin particles of, for example, from about 0.01 micron to about 1 micron can be selected from polymer microsuspension process, such as those illustrated in U.S. Pat. No. 3,674,736, the disclosure of which is totally incorporated herein by reference, polymer solution microsuspension process, such as disclosed in U.S. Pat. No. 5,290,654, the disclosure of which is totally incorporated herein by reference, mechanical grinding process, or other known processes; and toner processes wherein the resin possesses a crosslinking percentage of from about 1 to about 50 and/or from about 1.5 to about 30.

Colorants present, for example, in amounts of from about 1 to about 20, and more specifically, from about 1 to about 12 weight percent include dyes, pigments, and mixtures thereof, colorant examples being illustrated in a number of the copending applications referenced herein, and more specifically, which colorants include known colorants like black, cyan, red, blue, magenta, green, brown, yellow, mixtures thereof, and the like.

Examples of anionic surfactants include, for example, sodium dodecylsulfate (SDS), sodium dodecylbenzene sulfonate, sodium dodecylnaphthalene sulfate, dialkyl benzenealkyl, sulfates and sulfonates, abitic acid, available from Aldrich, NEOGEN RK™, NEOGEN SC™ from Kao, and the like. An effective concentration of the anionic surfactant generally employed is, for example, from about 0.01 to about 10 percent by weight, and preferably from about 0.1 to about 5 percent by weight of monomers used to prepare the toner polymer resin.

Examples of nonionic surfactants that may be, for example, included in the resin latex dispersion include, for example, polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy) ethanol, available from Rhodia as IGEPAL CA-210®, IGEPAL CA-520®, IGEPAL CA-720®, IGEPAL CO-890®, IGEPAL CO-720®, IGEPAL CO-290®, IGEPAL CA-210®, ANTAROX 890® and ANTAROX 897®. A suitable concentration of the nonionic surfactant is, for example, from about 0.01 to about 10 percent by weight, and preferably from about 0.1 to about 5 percent by weight of monomers used to prepare the toner polymer resin.

Examples of the cationic surfactants, which are usually positively charged, selected for the toners and processes of the present invention include, for example, alkylbenzyl dimethyl ammonium chloride dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof. A suitable amount of surfactant can be selected, such as from about 0.2 to about 5 percent by weight of the toner components.

Counterionic coagulants may be comprised of organic, or inorganic entities, and the like. For example, in embodiments the ionic surfactant of the resin latex dispersion can be an anionic surfactant, and the counterionic coagulant can be a polymetal halide or a polymetal sulfo silicate (PASS). Coagulants that can be included in the toner in amounts of, for example, from about 0.05 to about 10 weight percent include polymetal halides, polymetal sulfosilicates monovalent, divalent or multivalent salts optionally in combination with cationic surfactants, and the like. Inorganic cationic coagulants include, for example, polyaluminum chloride (PAC), polyaluminum sulfo silicate (PASS), aluminum sulfate, zinc sulfate, or magnesium sulfate.

Examples of dispersants that can be suitable for dispersing the pigment particles included functional copolymers, such as for example methyl vinyl ether-maleic acid, methyl vinyl ethermaleic acid calcium sodium salt, hydrophobically modified polyethers, polyvinylpyrrolidone homopolymers, alkylated vinylpyrrolidone copolymers, vinyl acetate/vinylpyrrolidone copolymers, vinylpyrrolidone/styrene block, poly(methyl vinyl ether/maleic anhydride) (linear interpolymer with 1:1 molar ratio), dimethylaminoethyl methacrylate, ethylene-vinyl acetate copolymer of maleic anhydride and acrylic acid, polystyrene-maleic anhydride, styrene-acrylic ester, ethyl acrylate/methyl methacrylate, carboxylated poly-n-butyl acrylates, and ethylene vinyl alcohol, and which, for example, permit the magnetite to be readily dispersible into a submicron particle size of, for example, about 30 to about 400 nanometers in either an acid or a base resulting in a magnetite-pigment that can be stabilized by resin particles.

The solids content of the resin latex dispersion is not particularly limited, thus the solids content may be from, for example, about 10 to about 90 percent. With regard to the colorants, such as carbon black, in some instances they are available in the wet cake or concentrated form containing water, and can be easily dispersed utilizing a homogenizer or simply by stirring or ball milling, attrition, or media milling. In other instances, pigments are available only in a dry form whereby dispersion in water is effected by microfluidizing using, for example, a M-110 microfluidizer or an ultimizer, and passing the pigment dispersion from about 1 to about 10 times through a chamber by sonication, such as using a Branson 700 sonicator, with a homogenizer, ball milling, attrition, or media milling with the optional addition of dispersing agents such as the aforementioned ionic or nonionic surfactants.

The coagulant is usually added slowly into the blend while continuously subjecting the blend to high shear, for example, by stirring with a blade at about 3,000 to about 10,000 rpm, and preferably about 5,000 rpm, for about 1 to about 120 minutes. A high shearing device, for example an intense homogenization device, such as the in-line IKA SD-41, may be used to ensure that the blend is homogeneous and uniformly dispersed.

After aggregation, the resulting particles are coalesced by, for example, first changing the pH to about 6 to about 8, followed by heating at a temperature above the Tg of the latex resin in the toner particles. The heating for coalescing can in embodiments be conducted at a temperature of from about 10° C. to about 50° C., or from about 25° C. to about 40° C. above the Tg of the resin for a suitable period, such as for example, about 30 minutes to about 10 hours.

During the coalescence, the pH is increased, for example, from about 2 to about 3 to about 6 to about 8, from about 2 to about 2.8 to about 6.5 to about 7.8 by the addition of a suitable pH increasing agent of, for example, sodium hydroxide. The increase in pH assists in stabilizing the aggregate particles and prevents/minimizes toner size growth and loss of GSD during further heating, for example raising the temperature about 10° C. to about 50° C. above the resin Tg. The reduction in pH during the coalescence for the fusion of the aggregates can be accomplished by using an acid. Examples of pH reducing agents include, for example, nitric acid, citric acid, sulfuric acid or hydrochloric acid, and the like.

In embodiments of the present invention, a multi-stage addition of latex is conducted. In particular, a portion, for example about 20 to about 40 percent of the total amount of latex, is retained while the remainder is subjected to homogenization and aggregation. In these embodiments, a majority of the latex is added at the onset while the remainder of the latex (the delayed latex) is added after the formation of the resin aggregates. This delayed addition of the second or additional latex provides in embodiments an outer shell of nonpigmented material around the magnetite/colorant core, thereby encapsulating the pigment in the core of the particles and away from the toner particle surface.

The obtained toner particles possess, for example, an average volume diameter of from about 0.5 to about 25, and more specifically, from about 1 to about 10 microns, and narrow GSD characteristics of, for example, from about 1.05 to about 1.25, or from about 1.15 to about 1.25 as measured by a Coulter Counter. The toner particles also possess an excellent shape factor, for example, of 120 or less wherein the shape factor refers, for example, to the measure of toner smoothness and toner roundness, where a shape factor of about 100 is considered spherical and smooth without any surface protrusions, while a shape factor of about 145 is considered to be rough in surface morphology and the shape is like a potato.

The toner particles illustrated herein may also include known charge additives in effective amounts of, for example, from 0.1 to 5 weight percent such as alkyl pyridinium halides, bisulfates, the charge control additives of U.S. Pat. Nos. 3,944,493; 4,007,293; 4,079,014; 4,394,430 and 4,560,635, the disclosures of which are totally incorporated herein by reference, and the like. Surface additives that can be added to the toner compositions after washing or drying include, for example, metal salts, metal salts of fatty acids, colloidal silicas, metal oxides, mixtures thereof, and the like, which additives are usually present in an amount of from about 0.1 to about 2 weight percent, reference U.S. Pat. Nos. 3,590,000; 3,720,617; 3,655,374 and 3,983,045, the disclosures of which are totally incorporated herein by reference. Specific additives include zinc stearate and AEROSIL R972® available from Degussa Chemical and present in an amount of from about 0.1 to about 2 percent which can be added during the aggregation process or blended into the formed toner product.

Developer compositions can be prepared by mixing the toners obtained with the process of the present invention with known carrier particles, including coated carriers, such as steel, ferrites, and the like, reference U.S. Pat. Nos. 4,937,166 and 4,935,326, the disclosures of which are totally incorporated herein by reference, for example from about 2 percent toner concentration to about 8 percent toner concentration.

The following Examples are provided. Parts and percentages are by weight unless otherwise indicated and temperatures are in degrees Centigrade. GSDv is expressed as (volume D84 percent/volume D16 percent)½ and GSDn is expressed as (number D84 percent/number D16 percent)½; the lower number average particle size index $GSDn_{50/16}$ is expressed as (D50 percent/number 16 percent), wherein D is the particle diameter and wherein the particles size distribution was measured with a Coulter Counter TA II or a Multisizer II (the particle diameters at which a cumulative percentage of, for example, 16 percent are attained refer to the volume D16 percent and number D16 percent, respectively; the particle diameters at which a cumulative percentage of 50 percent are attained are defined as volume D50 percent and number D50 percent, respectively, and the particle diameters at which a cumulative percentage of 84 percent are attained are defined as volume D84 percent and number D84 percent, respectively).

Latex Evaluation:

The weight average molecular weight $M_w$ and number average molecular weight $M_n$ of a polymer latex were determined on a Waters GPC. A mobile phase of tetrahydrofuran and six Waters Styragel columns were used. The samples were dissolved in tetrahydrofuran, filtered through 0.2 micron TEFLON® filters and injected into the GPC system. Polystyrene standards ranging from 4,230,000 to 1260 g/mol were used for the calibration.

The Tg (Glass Transition Temperature) of the polymer latex was measured on a Seiko DSC. 10 Milligrams of each sample were weighed into an aluminum DSC pan. The temperature ramps, both heating and cooling segments, were run at 10° C. per minute. The ramps used were heated to 100° C., cooled to −30° C. and reheated to 100° C.

The determination of percent total gel of a polymer latex was by a gravimetric filtration technique. The sample dissolution in toluene was followed by vacuum filtration. The collecting membrane was dried and weighted for percent gel retained.

The melt flow index (MFI) of polymer latex was measured on a Tinius Olsen extrusion plastometer at 130° C. with 2.2 kilograms load force. The Tinius Olsen was set to a temperature set point of 130° C. with the proper applied load force of 2.2 kilograms. The sample was then dispensed into the heated barrel of the melt indexer, equilibrated for six minutes; then there was applied a specified load force to the melt indexer's piston. The applied load caused the downward motion of the piston forcing the molten sample out a predetermined orifice opening. The time was determined when a predetermined one inch of travel by the piston was measured. The melt flow was calculated by the use of the time, distance, and weight volume extracted during the testing procedure.

The crosslinking molecular weight $M_c$ and crosslinking density $M_e$ of a polymer latex was obtained in a temperature dispersion measurement in a dynamic viscoelasticity by a sinusoidal wave oscillation method in a Rheometrics rheometer. In the temperature dispersion measurement of the dynamic viscoelasticity, usually after forming a polymer latex into a tablet, the tablet was set in parallel plates having a diameter of 8 millimeters, and after making a normal force 0, a sinusoidal wave was given at an oscillation frequency of 10 rad/second. The measurement was initiated from 40° C. and continued to 170° C. The interval of the measurement time was 120 seconds and the temperature-raising speed after initiation of the measurement was 1° C./minute. During measurement, at each measurement temperature, the strain amount was properly maintained and properly controlled so that an appropriate measurement value was obtained.

The volume average diameter of a polymer latex was measured by laser light scattering technique on a Coulter N4 Plus Particle Sizer.

The viscosity and static yield stress of a polymer latex dispersion were determined in a Couette flow by Rheometrics Fluid Spectrometer. The Rheometrics Fluid Spectrometer was set to a temperature set point of 25° C. with the polymer latex dispersion having solid contents of about 38 to about 42 percent, based on the total weight of a polymer latex dispersion. The measurement was initiated from shear rate of 0.1 $s^{-1}$ and continued to shear rate of 1,000 $s^{-1}$. At each measurement shear rate, the temperature was properly maintained at 25° C. so that an appropriate viscosity value was obtained. The static yield stress was set as the shear stress at shear rate of about 0.1 $s^{-1}$.

PREPARATION OF THE POLYMER LATEXES

Latex Example I

A polymer latex (EP206) comprised of a styrene/n-butyl acrylate/β-carboxyethyl acrylate copolymer of 74:23:3 was prepared with 1.7 pph dodecanethiol (chain transfer agent), 0.35 pph branching agent (A-DOD, decanediol diacrylate, available from Shin-Najamura Co., Japan) and 1.5 percent of ammonium persulfate initiator was synthesized by a semicontinuous emulsion polymerization process using the anionic surfactant DOWFAX 2A1™ (sodium tetrapropyl diphenoxide disulfonate, 47 percent active, available from Dow Chemical).

In a 300 gallon jacketed stainless steel reactor with double flight impellers (a four pitched-blade impeller each) set at 35 rpm, 387 kilograms of deionized water with 521 grams of DOWFAX 2A1™ (7 percent of the total surfactant) were charged while the temperature was raised from room temperature, about 23° C., to about 25° C. to about 75° C. A monomer emulsion was prepared by mixing a monomer mixture (310.8 kilograms of styrene, 96.6 kilograms of n-butyl acrylate, 12.2 kilograms of 2-carboxyethyl acrylate (β-CEA), 1.43 kilograms of A-DOD and 4.5 kilograms of 1-dodecanethiol) with 193 kilograms of deionized water and 8.07 kilograms of DOWFAX 2A1™ (93 percent of the total surfactant) at room temperature, about 22° C. to about 25° C. throughout the Examples, for 30 minutes in a 150 gallon Pope tank. 6.3 Kilograms of the seed were pumped from the monomer emulsion into a 20 gallon Pope tank and subsequently the seed was charged into the reactor at 75° C. An initiator solution prepared from 6.1 kilograms of ammonium persulfate in 30.2 kilograms of deionized water was added over 20 minutes after the seed emulsion addition. The reactor was stirred at 48 rpm for an additional 20 minutes to allow seed particle formation at 75° C. The monomer emulsion was then fed into the reactor. Monomer emulsion feeding was stopped after 110 minutes and 2.49 kilograms of 1-dodecanethiol (DDT) were added to the remaining emulsion in the 150 gallon Pope tank which was mixed for a further 5 minutes before feeding resumed. The remaining monomer emulsion was fed into the reactor over 90 minutes. At the end of the monomer feed, the emulsion was post-heated at 75° C. for 180 minutes, then cooled to 25° C. The reaction system was deoxygenated by passing a stream of nitrogen through it during the reaction. A latex resin containing 42 solids of 42 weight percent styrene-butyl acrylate-β-carboxy ethylacrylate resin, 57 weight percent water, 0.4 weight percent anionic surfactant DOWFAX 2A1™, 0.6 percent of an ammonium sulfate salt species was obtained. The resulting polymer poly(styrene-butyl acrylate-acrylic acid-β-carboxyethyl acrylate) possessed a weight average molecular weight $M_w$ of 33,200, and a number average molecular weight $M_n$ of 10,400, as determined on a Waters GPC, and a mid-point Tg of 50.7° C., as measured on a Seiko DSC. The resulting polymer also possessed a gel content of 2.5 percent based on the polymer, as measured by a gravimetric filtration technique, a melt flow index (MFI) of 34.9 grams/10 minutes, as measured on a extrusion plastometer at 130° C. with a 2.2 kilogram load force, a crosslinking molecular weight $M_c$ of 23,000, and a crosslinking density $M_e$ of $6.2 \times 10^{-8}$/K-mole, as obtained in a temperature dispersion measurement in a dynamic viscoelasticity by a sinusoidal wave oscillation method. The latex resin or polymer possessed a volume average diameter of 222 nanometers as measured by light scattering technique on a Coulter N4 Plus Particle Sizer. The latex resin containing 42 weight percent solids possessed a static yield stress of 0.5 dyne/cm$^2$, and a viscosity of 17.26 centipoises (cps) at shear rate of 1 s$^{-1}$, as determined in a Couette flow using a Rheometrics Fluid Spectrometer.

Latex Example II

A polymer latex (EP207) comprised of styrene/n-butyl acrylate/β-carboxyethyl acrylate copolymer of 74:23:3 with 1.7 pph dodecanethiol (chain transfer agent, 0.35 pph branching agent (A-DOD, decanediol diacrylate) and 1.5 percent of ammonium persulfate initiator was synthesized by a semicontinuous emulsion polymerization process.

In a 300 gallon jacketed stainless steel reactor with double flight impellers (a four pitched-blade impeller each) set at 35 rpm, 387 kilograms of deionized water with 521 grams of DOWFAX 2A1™ (7 percent of the total surfactant) were charged while the temperature was raised from room temperature to 75° C. A monomer emulsion was prepared by mixing a monomer mixture (310.8 kilograms of styrene, 96.6 kilograms of n-butyl acrylate, 12.2 kilograms of 2-carboxyethyl acrylate (β-CEA), 1.43 kilograms of A-DOD and 4.5 kilograms of 1-dodecanethiol) with 193 kilograms of deionized water and 8.07 kilograms of DOWFAX 2A1™ (93 percent of the total surfactant) at room temperature for 30 minutes in a 150 gallon Pope tank. 6.3 Kilograms of seed were pumped from the monomer emulsion into a 20 gallon Pope tank, and subsequently the seed was charged into the reactor at 75° C. An initiator solution prepared from 6.1 kilograms of ammonium persulfate in 30.2 kilograms of deionized water was added over 20 minutes after the seed emulsion addition. The reactor was stirred at 48 rpm for an additional 20 minutes to allow seed particle formation at 75° C. The monomer emulsion was fed into the reactor. Monomer emulsion feeding was stopped after 105 minutes and 2.49 kilograms of 1-dodecanethiol (DDT) were added to the remaining emulsion in the 150 gallon Pope tank which was mixed for a further 5 minutes before feeding resumed. The remaining monomer emulsion was fed into the reactor over 100 minutes. At the end of the monomer feed, the emulsion was post-heated at 75° C. for 180 minutes, then cooled to 25° C. The reaction system was deoxygenated by passing a stream of nitrogen through it during the reaction. A latex resin containing 42 solids of 42 weight percent styrene-butyl acrylate-β-carboxy ethylacrylate resin, 57 weight percent water, 0.4 weight percent anionic surfactant DOWFAX 2A1™, 0.6 percent of an ammonium sulfate salt species was obtained. The resulting polymer poly(styrene-butyl acrylate-acrylic acid-β-carboxyethyl acrylate) possessed a weight average molecular weight $M_w$ of 33,900, and a number average molecular weight $M_n$ of 11,300, as determined on a Waters GPC, and a mid-point Tg of 51.4° C., as measured on a Seiko DSC. The resulting polymer also possessed a gel content of 1.4 percent based on the polymer, as measured by a gravimetric filtration technique, a melt flow index (MFI) of 35 grams/10 minute, as measured on an extrusion plastometer at 130° C. with 2.2 kilogram load force, a crosslinking molecular weight $M_c$ of 30,000, and a crosslinking density $M_e$ of $5.1 \times 10^{-8}$/K-mole, as obtained in a temperature dispersion measurement in a dynamic viscoelasticity by a sinusoidal wave oscillation method. The latex resin or polymer possessed a volume average diameter of 227 nanometers as measured by the known light scattering technique on a Coulter N4 Plus Particle Sizer. The latex resin containing 42 weight percent solids possessed a static yield stress of 0.6 dyne/cm$^2$, and a viscosity of 19.15 centipoises (cps) at shear rate of 1 s$^{-1}$, as determined in a Couette flow using a Rheometrics Fluid Spectrometer.

Latex Example III

A polymer latex (EP208) comprised of styrene/n-butyl acrylate/β-carboxyethyl acrylate copolymer of 75:22:3 composition with 1.7 pph dodecanethiol (chain transfer agent), 0.35 pph branching agent (A-DOD, decanediol diacrylate) and 1.5 percent of ammonium persulfate initiator was synthesized by a semicontinuous emulsion polymerization process.

In a 300 gallon jacketed stainless steel reactor with double flight impellers (a four pitched-blade impeller each) set at 35 rpm, 387 kilograms of deionized water with 730 grams of DOWFAX 2A1™ (8.5 percent of the total surfactant) were charged while the temperature was raised from room temperature to 75° C. A monomer emulsion was prepared by mixing a monomer mixture (315 kilograms of styrene, 92.4 kilograms of n-butyl acrylate, 12.2 kilograms of 2-carboxyethyl acrylate (β-CEA), 1.43 kilograms of A-DOD and 4.5 kilograms of 1-dodecanethiol) with 193 kilograms of deionized water and 7.86 kilograms of DOWFAX 2A1™ (91.5 percent of the total surfactant) at room temperature for 30 minutes in a 150 gallon Pope tank. 6.3 Kilograms of seed were pumped from the monomer emulsion into a 20 gallon Pope tank, and subsequently the seed was later charged into the reactor at 75° C. An initiator solution prepared from 6.1 kilograms of ammonium persulfate in 30.2 kilograms of deionized water was added over 20 minutes after the seed emulsion addition. The reactor was stirred at 48 rpm for an additional 20 minutes to allow seed particle formation at 75° C. The monomer emulsion was fed into the reactor. Monomer emulsion feeding was stopped after 110 minutes and 2.49 kilograms of 1-dodecanethiol (DDT) were added to the remaining emulsion in the 150 gallon Pope tank which was mixed for a further 5 minutes before feeding resumed. The remaining monomer emulsion was fed into the reactor over 90 minutes. At the end of the monomer feed, the emulsion was post-heated at 75° C. for 180 minutes, then cooled to 25° C. The reaction system was deoxygenated by passing a stream of nitrogen through it during the reaction. A latex resin containing 42 solids of 42 weight percent styrene-butyl acrylate-β-carboxy ethylacrylate resin, 57 weight percent water, 0.4 weight percent anionic surfactant DOWFAX 2A1™ 0.6. percent of an ammonium sulfate salt species was obtained. The resulting polymer poly(styrene-butyl acrylate-acrylic acid-β-carboxyethyl acrylate) possessed a weight average molecular weight $M_w$ of 33,600, and a number average molecular weight $M_n$ of 11,400, as determined on a Waters GPC, and a mid-point Tg of 51.3° C., as measured on a Seiko DSC. The resulting polymer also possessed a gel content of 1.4 percent based on the polymer, as measured by a gravimetric filtration technique, a melt flow index (MFI) of 34.9 grams/10 minutes, as measured on a extrusion plastometer at 130° C. with 2.2 kilogram load force, a crosslinking molecular weight $M_c$ of 35,000, and a crosslinking density Me of $5 \times 10^{-8}$/K-mole, as obtained in a temperature dispersion measurement in a dynamic viscoelasticity by a sinusoidal wave oscillation method. The latex resin or polymer possessed a volume average diameter of 213 nanometers as measured by light scattering technique on a Coulter N4 Plus Particle Sizer. The latex resin containing 42 weight percent solids possessed a static yield stress of 0.5 dyne/cm², and a viscosity of 18.79 centipoises (cps) at shear rate of 1 s⁻¹, as determined in a Couette flow using a Rheometrics Fluid Spectrometer.

Latex Example IV

A polymer latex (EP210) comprised of styrene/n-butyl acrylate/β-carboxyethyl acrylate copolymer of 74:23:3 composition with 1.7 pph dodecanethiol (chain transfer agent), 0.35 pph branching agent (A-DOD, decanediol diacrylate) and 1.5 percent of ammonium persulfate initiator was synthesized by a semicontinuous emulsion polymerization process. In a 300 gallon jacketed stainless steel reactor with double flight impellers (a four pitched-blade impeller each) set at 35 rpm, 387 kilograms of deionized water with 521 grams of DOWFAX 2A1™ (7 percent of the total surfactant) were charged while the temperature was raised from room temperature to 75° C. A monomer emulsion was prepared by mixing a monomer mixture (310.8 kilograms of styrene, 96.6 kilograms of n-butyl acrylate, 12.2 kilograms of 2-carboxyethyl acrylate (β-CEA), 1.43 kilograms of A-DOD and 4.5 kilograms of 1-dodecanethiol) with 193 kilograms of deionized water and 8.07 kilograms of DOWFAX 2A1™ (93 percent of the total surfactant) at room temperature for 30 minutes in a 150 gallon Pope tank. 6.3 Kilograms of seed were pumped from the monomer emulsion into a 20 gallon Pope tank and subsequently the seed was later charged into the reactor at 75° C. An initiator solution prepared from 6.1 kilograms of ammonium persulfate in 30.2 kilograms of deionized water was added over 20 minutes after the seed emulsion addition. The reactor was stirred at 48 rpm for an additional 20 minutes to allow seed particle formation at 75° C. The monomer emulsion was fed into the reactor. Monomer emulsion feeding was stopped after 90 minutes and 2.49 kilograms of 1-dodecanethiol (DDT) were added to the remaining emulsion in the 150 gallon Pope tank which was mixed for a further 5 minutes before feeding resumed. The remaining monomer emulsion was fed into the reactor over 90 minutes. At the end of the monomer feed, the emulsion was post-heated at 75° C. for 180 minutes, then cooled to 25° C. The reaction system was deoxygenated by passing a stream of nitrogen through it during the reaction. A latex resin containing 42 solids of 42 weight percent styrene-butyl acrylate-β-carboxy ethylacrylate resin, 57 weight percent water, 0.4 weight percent anionic surfactant DOWFAX 2A1™, 0.6 percent of an ammonium sulfate salt species was obtained. The resulting polymer poly(styrene-butyl acrylate-acrylic acid-β-carboxyethyl acrylate) possessed a weight average molecular weight $M_w$ of 33,600, and a number average molecular weight $M_n$ of 10,500, as determined on a Waters GPC, and a mid-point Tg of 51.7° C., as measured on a Seiko DSC. The resulting polymer also possessed a gel content of 1 percent based on the polymer, as measured by a gravimetric filtration technique, a melt flow index (MFI) of 35.5 grams/10 minutes, as measured on a extrusion plastometer at 130° C. with 2.2 kilogram load force, a crosslinking molecular weight $M_c$, of 59,000, and a crosslinking density $M_e$ of $4.6 \times 10^{-8}$/K-mole, as obtained in a temperature dispersion measurement in a dynamic viscoelasticity by a sinusoidal wave oscillation method. The latex resin or polymer possessed a volume average diameter of 244 nanometers as measured by light scattering technique on a Coulter N4 Plus Particle Sizer. The latex resin containing 42 solids possessed a static yield stress of 0.4 dyne/cm², and a viscosity of 16.91 centipoises (cps) at shear rate of 1 s⁻¹, as determined in a Couette flow using a Rheometrics Fluid Spectrometer.

Latex Example V

A polymer latex (EP211) comprised of styrene/n-butyl acrylate/β-carboxyethyl acrylate copolymer of 74:23:3 composition with 1.7 pph dodecanethiol (chain transfer agent), 0.35 pph branching agent (A-DOD, decanediol diacrylate) and 1.5 percent of ammonium persulfate initiator was synthesized by a semicontinuous emulsion polymerization process.

In a 300 gallon jacketed stainless steel reactor with double flight impellers (a four pitched-blade impeller each) set at 35 rpm, 387 kilograms of deionized water with 473 grams of DOWFAX 2A1™ (5.5 percent of the total surfactant) were charged while the temperature was raised from room temperature to 75° C. A monomer emulsion was prepared by mixing a monomer mixture (310.8 kilograms of styrene, 96.6 kilograms of n-butyl acrylate, 12.2 kilograms of 2-carboxyethyl acrylate (β-CEA), 1.43 kilograms of A-DOD and 4.5 kilograms of 1-dodecanethiol) with 193 kilograms of deionized water and 8.11 kilograms of DOWFAX 2A1™ (94.5 percent of the total surfactant) at room temperature for 30 minutes in a 150 gallon Pope tank. 6.3 Kilograms of seed were pumped from the monomer emulsion into a 20 gallon Pope tank and subsequently the seed was later charged into the reactor at 75° C. An initiator solution prepared from 6.1 kilograms of ammonium persulfate in 30.2 kilograms of deionized water was added over 20 minutes after the seed emulsion addition. The reactor was stirred at 48 rpm for an additional 20 minutes to allow seed particle formation at 75° C. The monomer emulsion was fed into the reactor. Monomer emulsion feeding was stopped after 90 minutes and 2.49 kilograms of 1-dodecanethiol (DDT) were added to the remaining emulsion in the 150 gallon Pope tank which was mixed for a further 5 minutes before feeding resumed. The remaining monomer emulsion was fed into the reactor over 110 minutes. At the end of the monomer feed, the emulsion was post-heated at 75° C. for 180 minutes, then cooled to 25° C. The reaction system was deoxygenated by passing a stream of nitrogen through it during the reaction. A latex resin containing 42 solids of 42 weight percent styrene-butyl acrylate-β-carboxy ethylacrylate resin, 57 weight percent water, 0.4 weight percent anionic surfactant DOWFAX 2A1™, 0.6 percent of an ammonium sulfate salt species was obtained. The resulting polymer poly(styrene-butyl acrylate-acrylic acid-β-carboxyethyl acrylate) possessed a weight average molecular weight $M_w$ of 35,700, and a number average molecular weight $M_n$ of 11,000, as determined on a Waters GPC, and a mid-point Tg of 51° C., as measured on a Seiko DSC. The resulting polymer also possessed a gel content of 1.2 percent based on the polymer, as measured by a gravimetric filtration technique, a melt flow index (MFI) of 34.9 grams/10 minutes, as measured on a extrusion plastometer at 130° C. with 2.2 kilogram load force, a crosslinking molecular weight $M_c$ of 39,000, and a crosslinking density $M_e$ of $4.9 \times 10^{-8}$/K-mole, as obtained in a temperature dispersion measurement in a dynamic viscoelasticity by a sinusoidal wave oscillation method. The latex resin or polymer possessed a volume average diameter of 193 nanometers as measured by light scattering technique on a Coulter N4 Plus Particle Sizer. The latex resin containing 42 weight percent solids possessed a yield stress of 1 dyne/cm², and a viscosity of 27.17 centipoises (cps) at shear rate of 1 s$^{-1}$, as determined in a Couette flow using a Rheometrics Fluid Spectrometer.

Comparative Latex Example I

A polymer latex (EP213) comprised of styrene/n-butyl acrylate/β-carboxyethyl acrylate copolymer of 74:23:3 composition with 1.7 pph dodecanethiol (chain transfer agent), 0.55 pph branching agent (A-DOD, decanediol diacrylate) and 1.5 percent of ammonium persulfate initiator was synthesized by a semicontinuous emulsion polymerization process.

In a 300 gallon jacketed stainless steel reactor with double flight impellers (a four pitched-blade impeller each) set at 35 rpm, 387 kilograms of deionized water with 521 grams of DOWFAX 2A1™ (7 percent of the total surfactant) were charged while the temperature was raised from room temperature to 75° C. A monomer emulsion was prepared by mixing a monomer mixture (310.8 kilograms of styrene, 96.6 kilograms of n-butyl acrylate, 12.2 kilograms of 2-carboxyethyl acrylate (β-CEA), 1.43 kilograms of A-DOD and 4.5 kilograms of 1-dodecanethiol) with 193 kilograms of deionized water and 8.07 kilograms of DOWFAX 2A1™ (93 percent of the total surfactant) at room temperature for 30 minutes in a 150 gallon Pope tank. 6.3 Kilograms of seed were pumped from the monomer emulsion into a 20 gallon Pope tank and subsequently the seed was later charged into the reactor at 75° C. An initiator solution prepared from 6.1 kilograms of ammonium persulfate in 30.2 kilograms of deionized water was added over 20 minutes after the seed emulsion addition. The reactor was stirred at 48 rpm for an additional 20 minutes to allow seed particle formation at 75° C. The monomer emulsion was fed into the reactor. Monomer emulsion feeding was stopped after 90 minutes and 2.49 kilograms of 1-dodecanethiol (DDT) were added to the remaining emulsion in the 150 gallon Pope tank which was mixed for a further 25 minutes before feeding resumed. The remaining monomer emulsion was fed into the reactor over 90 minutes. At the end of the monomer feed, the emulsion was post-heated at 73° C. for 180 minutes, then cooled to 25° C. The reaction system was deoxygenated by passing a stream of nitrogen through it during the reaction. A latex resin containing 42 solids of 42 weight percent styrene-butyl acrylate-β-carboxy ethylacrylate resin, 57 weight percent water, 0.4 weight percent anionic surfactant DOWFAX 2A1™, 0.6 percent of an ammonium sulfate salt species was obtained. The resulting polymer poly(styrene-butyl acrylate-acrylic acid-β-carboxyethyl acrylate) possessed a weight average molecular weight $M_w$ of 32,900, and a number average molecular weight $M_n$ of 11,700, as determined on a Waters GPC, and a mid-point Tg of 50.3° C., as measured on a Seiko DSC. The resulting polymer also possessed a gel content of 2.1 percent based on the polymer, as measured by a gravimetric filtration technique, a melt flow index (MFI) of 32.9 grams/10 minutes, as measured on a extrusion plastometer at 130° C. with 2.2 kilogram load force, a crosslinking molecular weight $M_c$ of 24,400, and a crosslinking density $M_e$ of $5.5 \times 10^-$/K-mole, as obtained in a temperature dispersion measurement in a dynamic viscoelasticity by a sinusoidal wave oscillation method. The latex resin or polymer possessed a volume average diameter of 175 nanometers as measured by the known light scattering technique on a Coulter N4 Plus Particle Sizer. The latex resin containing 42 weight percent solids possessed a static yield stress of 3.5 dyne/cm², and a viscosity of 58.35 centipoises (cps) at shear rate of 1 s$^{-1}$, as determined in a Couette flow using a Rheometrics Fluid Spectrometer.

Comparative Latex Example II

A polymer latex (EP217) comprised of styrene/n-butyl acrylate/β-carboxyethyl acrylate copolymer of 74:23:3 composition with 1.7 pph dodecanethiol (chain transfer agent), 0.55 pph branching agent (A-DOD, decanediol diacrylate) and 1.5 percent of ammonium persulfate initiator was synthesized by a semicontinuous emulsion polymerization process.

In a 300 gallon jacketed stainless steel reactor with double flight impellers (a four pitched-blade impeller each) set at 35 rpm, 387 kilograms of deionized water with 521 grams of DOWFAX 2A1™ (7 percent of the total surfactant) were charged while the temperature was raised from room temperature to 75° C. A monomer emulsion was prepared by mixing a monomer mixture (310.8 kilograms of styrene, 96.6 kilograms of n-butyl acrylate, 12.2 kilograms of 2-carboxyethyl acrylate (β-CEA), 4.50 kilograms of A-DOD and 4.5 kilograms of 1-dodecanethiol) with 193 kilograms of deionized water and 8.07 kilograms of DOWFAX 2A1™ (93 percent of the total surfactant) at room temperature for 30 minutes in a 150 gallon Pope tank. 6.3 Kilograms of seed were pumped from the monomer emulsion into a 20 gallon Pope tank and subsequently the seed was later charged into the reactor at 75° C. An initiator solution prepared from 6.1 kilograms of ammonium persulfate in 30.2 kilograms of deionized water was added over 20 minutes after the seed emulsion addition. The reactor was stirred at 48 rpm for an additional 20 minutes to allow seed particle formation at 75° C. The monomer emulsion was fed into the reactor. Monomer emulsion feeding was stopped after 75 minutes and 2.49 kilograms of 1-dodecanethiol (DDT) were added to the remaining emulsion in the 150 gallon Pope tank which was mixed for a further 5 minutes before feeding resumed. The remaining monomer emulsion was fed into the reactor over 60 minutes. At the end of the monomer feed, the emulsion was post-heated at 75° C. for 180 minutes, then cooled to 25° C. The reaction system was deoxygenated by passing a stream of nitrogen-through it during the reaction. A latex resin containing 42 solids of 42 weight percent styrene-butyl acrylate-β-carboxy ethylacrylate resin, 57 weight percent water, 0.4 weight percent anionic surfactant DOWFAX 2A1™, 0.6 percent of an ammonium sulfate salt species was obtained. The resulting polymer poly(styrene-butyl acrylate-acrylic acid-β-carboxyethyl acrylate) possessed a weight average molecular weight $M_w$ of 33,200, and a number average molecular weight $M_n$ of 11,100, as determined on a Waters GPC, and a mid-point Tg of 53.2° C., as measured on a Seiko DSC. The resulting polymer also possessed a gel content of 6.3 percent based on the polymer, as measured by a gravimetric filtration technique, a melt flow index (MFI) of 17.9 grams/10 minutes, as measured on a extrusion plastometer at 130° C. with 2.2 kilograms load force, a crosslinking molecular weight $M_c$ of 11,000, and a crosslinking density $M_e$ of $3.3 \times 10^{-7}$/K-mole, as obtained in a temperature dispersion measurement in a dynamic viscoelasticity by a sinusoidal wave oscillation method. The latex resin or polymer possessed a volume average diameter of 247 nanometers as measured by the known light scattering technique on a Coulter N4 Plus Particle Sizer. The latex resin containing 42 weight percent solids possessed a static yield stress of 1 dyne/cm$^2$, and a viscosity of 28.41 centipoises (cps) at shear rate of 1 s$^{-1}$, as determined in a Couette flow using a Rheometrics Fluid Spectrometer.

Comparative Latex Example III

A polymer latex (EP212) comprised of styrene/n-butyl acrylate/β-carboxyethyl acrylate copolymer of 74:23:3 composition with 1.7 pph dodecanethiol (chain transfer agent), 0.55 pph branching agent (A-DOD, decanediol diacrylate) and 1.5 percent of ammonium persulfate initiator was synthesized by a semicontinuous emulsion polymerization process.

In a 300 gallon jacketed stainless steel reactor with double flight impellers (a four pitched-blade impeller each) set at 35 rpm, 387 kilograms of deionized water with 521 grams of DOWFAX 2A1™ (7 percent of the total surfactant) were charged while the temperature was raised from room temperature to 75° C. A monomer emulsion was prepared by mixing a monomer mixture (310.8 kilograms of styrene, 96.6 kilograms of n-butyl acrylate, 12.2 kilograms of 2-carboxyethyl acrylate (β-CEA), 2.25 kilograms of A-DOD and 4.5 kilograms of 1-dodecanethiol) with 193 kilograms of deionized water and 8.07 kilograms of DOWFAX 2A1™ (93 percent of the total surfactant) at room temperature for 30 minutes in a 150 gallon Pope tank. 6.3 Kilograms of seed were pumped from the monomer emulsion into a 20 gallon Pope tank and subsequently the seed was later charged into the reactor at 75° C. An initiator solution prepared from 6.1 kilograms of ammonium persulfate in 30.2 kilograms of deionized water was added over 20 minutes after the seed emulsion addition. The reactor was stirred at 48 rpm for an additional 20 minutes to allow seed particle formation at 75° C. The monomer emulsion was fed into the reactor. Monomer emulsion feeding was stopped after 75 minutes and 2.49 kilograms of 1-dodecanethiol (DDT) were added to the remaining emulsion in the 150 gallon Pope tank which was mixed for a further 5 minutes before feeding resumed. The remaining monomer emulsion was fed into the reactor over 60 minutes. At the end of the monomer feed, the emulsion was post-heated at 75° C. for 180 minutes, then cooled to 25° C. The reaction system was deoxygenated by passing a stream of nitrogen through it during the reaction. A latex resin containing 42 solids of 42 weight percent styrene-butyl acrylate-β-carboxy ethylacrylate resin, 57 weight percent water, 0.4 weight percent anionic surfactant DOWFAX 2A1™, 0.6 percent of an ammonium sulfate salt species was obtained. The resulting polymer poly(styrene-butyl acrylate-acrylic acid-β-carboxyethyl acrylate) possessed a weight average molecular weight $M_w$ of 58,200, and a number average molecular weight $M_n$ of 18,400, as determined on a Waters GPC, and a mid-point Tg of 50.1° C., as measured on a Seiko DSC. The resulting polymer also possessed a gel content of 3 percent based on the polymer, as measured by a gravimetric filtration technique, a melt flow index (MFI) of 29.1 grams/10 minutes, as measured on a extrusion plastometer at 130° C. with 2.2 kilogram load force, a crosslinking molecular weight $M_c$ of 21,000, and a crosslinking density $M_e$ of $7.1 \times 10^{-8}$/K-mole, as obtained in a temperature dispersion measurement in a dynamic viscoelasticity by a sinusoidal wave oscillation method. The latex resin or polymer possessed a volume average diameter of 239 nanometers as measured by the known light scattering technique on a Coulter N4 Plus Particle Sizer. The latex resin containing 42 weight percent solids possessed a yield stress of 1.2 dyne/cm$^2$, and a viscosity of 16.47 centipoises (cps) at shear rate of 1 s$^{-1}$, as determined in a Couette flow using a Rheometrics Fluid Spectrometer.

Comparative Latex Example IV

A polymer latex (EP215) comprised of styrene/n-butyl acrylate/β-carboxyethyl acrylate copolymer of 74:23:3 composition with 1.7 pph dodecanethiol (chain transfer agent), 0.25 pph branching agent (A-DOD, decanediol diacrylate) and 1.5 percent of ammonium persulfate initiator was synthesized by a semicontinuous emulsion polymerization process.

In a 300 gallon jacketed stainless steel reactor with double flight impellers (a four pitched-blade impeller each) set at 35 rpm, 387 kilograms of deionized water with 521 grams of DOWFAX 2A1™ (7 percent of the total surfactant) were charged while the temperature was raised from room temperature to 75° C. A monomer emulsion was prepared by mixing a monomer mixture (310.8 kilograms of styrene, 96.6 kilograms of n-butyl acrylate, 12.2 kilograms of 2-carboxyethyl acrylate (β-CEA), 1.02 kilograms of A-DOD and 4.5 kilograms of 1-dodecanethiol) with 193 kilograms of deionized water and 8.07 kilograms of DOWFAX 2A1™ (93 percent of the total surfactant) at room temperature for 30 minutes in a 150 gallon Pope tank. 6.3 Kilograms of seed were pumped from the monomer emulsion into a 20 gallon Pope tank and subsequently the seed was later charged into the reactor at 75° C. An initiator solution prepared from 6.1 kilograms of ammonium persulfate in 30.2 kilograms of deionized water was added over 20 minutes after the seed emulsion addition. The reactor was stirred at 48 rpm for an additional 20 minutes to allow seed particle formation at 75° C. The monomer emulsion was fed into the reactor. Monomer emulsion feeding was stopped after 140 minutes and 2.49 kilograms of 1-dodecanethiol (DDT) were added to the remaining emulsion in the 150 gallon Pope tank which was mixed for a further 5 minutes before feeding resumed. The remaining monomer emulsion was fed into the reactor over 120 minutes. At the end of the monomer feed, the emulsion was post-heated at 75° C. for 180 minutes, then cooled to 25° C. The reaction system was deoxygenated by passing a stream of nitrogen through it during the reaction. A latex resin containing 42 solids of 42 weight percent styrene-butyl acrylate-carboxy ethylacrylate resin, 57 weight percent water, 0.4 weight percent anionic surfactant DOWFAX 2A1™, 0.6 percent of an ammonium sulfate salt species was obtained. The resulting polymer poly(styrene-butyl acrylate-acrylic acid-β-carboxyethyl acrylate) possessed a weight average molecular weight $M_w$ of 19,700, and a number average molecular weight $M_n$ of 4,300, as determined on a Waters GPC, and a mid-point Tg of 50.5° C., as measured on a Seiko DSC. The resulting polymer also possessed a gel content of 1.2 percent based on the polymer, as measured by a gravimetric filtration technique, a melt flow index (MFI) of 38 grams/10 minutes, as measured on a extrusion plastometer at 130° C. with 2.2 kilograms load force, a crosslinking molecular weight $M_c$ of 35,000, and a crosslinking density $M_e$ of $4.7 \times 10^{-8}$/K-mole, as obtained in a temperature dispersion measurement in a dynamic viscoelasticity by a sinusoidal wave oscillation method. The latex resin or polymer possessed a volume average diameter of 186 nanometers as measured by light scattering technique on a Coulter N4 Plus Particle Sizer. The latex resin containing 42 weight percent solids possessed a static yield stress of 0.6 dyne/cm$^2$, and a viscosity of 20.62 centipoises (cps) at shear rate of 1 s$^{-1}$, as determined in a Couette flow using a Rheometrics Fluid Spectrometer.

EXAMPLE I 5.6 Micron Black Toner Particles Generated by PAC A/C Process:

The polymer latex of Latex Example I (EP206) above was utilized in an aggregation/coalescence (A/C) process to produce 5.6 micron (volume average diameter) toner particles with a narrow size distribution.

500 Grams of deionized water was placed in a stainless steel beaker and homogenized at 5,000 rpm, while there were added 300 grams of latex EP206, 37.16 grams of the polyethylene wax POLYWAX 725® dispersion ($M_w$ of 725, 31 percent active, available from Baker-Petrolite Company) followed by the addition of 38.3 grams of a REGAL 330™ black pigment dispersion (17 percent active, available from Sun Chemicals) diluted with 110 grams of deionized water. To the resulting homogenized latex/pigment blend, 2.4 grams of 10 percent PAC (polyaluminum chloride obtained from Asada Company of Japan) solution diluted with 24 grams of 0.02 N HNO$_3$ was added dropwise to cause a flocculation of the black pigment REGAL 330™ carbon black, 6 percent by weight, the POLYWAX 725®, 9 percent by weight, the resin, 84.88 weight percent, and 0.12 weight percent of the PAC. After the addition was complete, homogenization was continued for an additional 2 minutes to form a creamy blend with an average particle size by volume of 2.68 and with a GSDv of 1.21. The creamy blend was then transferred into a 2 liter glass reactor and stirred at 350 rpm, while being heated to about 52° C. to about 53° C. Particle growth was monitored during heating. When the particle size diameter of the solids by volume was equal to 5.44 (GSDv=1.20), the pH of the slurry (slurry was comprised of about 16 weight percent of toner particles and of about 84 weight percent of water; toner was comprised of about 6 percent of black pigment REGAL 330™, about 9 percent of POLYWAX 725®, about 0.2 weight percent of PAC and about 84.8 percent by weight of the resin poly (styrene-butyl acrylate-2-carboxyethyl acrylate), and wherein the total amount of the toner components was about 100 percent) was adjusted to 7.5 by the addition of a 2 percent NaOH solution and the speed in the reactor was reduced to 200 rpm. After ½ hour of stirring at 53° C., the temperature in the reactor was increased to 95° C. After 1 hour of heating at 95° C., the pH of the slurry was adjusted to 4.3 and the heating was continued for an additional 5 hours. Thereafter, the reactor contents were cooled down to about room temperature, throughout the Examples about 23° C. to about 25° C., and were discharged. A 16 percent solids slurry of 5.62 micron black toner particles with GSDv=1.19, GSDn=1.22, GSDn$_{50/16}$=1.25, and a ratio of GSDv/GSDn of 0.975 was obtained. The resulting toner product was comprised of about 6 percent of black pigment REGAL 330™, about 9 percent of POLYWAX 725®, about 0.2 weight percent of PAC, and about 84.8 percent by weight of the resin poly(styrene-butyl acrylate-2-carboxyethyl acrylate), and wherein the total amount of the toner components was about 100 percent. The toner particles were then washed with deionized water five times.

EXAMPLE II 5.6 Micron Cyan Toner Particles Generated by a PAC A/C Process:

The polymer latex of Latex Example II (EP207) above was utilized in an aggregation/coalescence process to produce 5.6 micron (volume average diameter) particles with a narrow size distribution.

500 Grams of deionized water were placed in a stainless steel beaker and homogenized at 5,000 rpm, while 300 grams of the above prepared latex EP207 were added, and 37.16 grams of polyethylene wax POLYWAX 725® dispersion and 5.7 grams of SNOWTEX® colloidal silica dispersion (21 percent active, available from Nissan Chemical) were added followed by the addition of 31.6 grams of the PB 15:3 cyan pigment dispersion (17 percent active, available from Sun Chemicals) diluted with 110 grams of deionized water. To the resulting homogenized latex/pigment blend, 2.4 grams of 10 percent PAC solution diluted with 24 grams of 0.02 N HNO$_3$ were added dropwise causing flocculation of the cyan pigment, 5 percent by weight, the POLYWAX 725®, 9 percent by weight, the SNOWTEX® colloidal silica, 1 percent by weight, the resin, 84.8 weight percent, and 0.2 weight percent of the PAC. After the addition was complete, homogenization was continued for an additional 2 minutes to form a creamy blend with an average particle diameter size by volume of 2.73, and a GSDv of 1.22. The creamy blend was then transferred into a 2 liter glass reactor and stirred at 350 rpm, while being heated to about 52° C. to about 53° C. Particle growth was monitored during heating. When the particle size by volume was equal to 5.61 (GSDv=1.21), the pH of the slurry (slurry was comprised of about 16 weight percent of toner and of about 84 weight percent of water; the toner was comprised of about 5 percent of cyan pigment PB 15:3, about 9 percent of POLYWAX 725®, about 1 percent of SNOWTEX® colloidal silica, about 84.8 percent by weight of poly(styrene-butyl acrylate-2-carboxyethyl acrylate), and about 0.2 percent of PAC, and wherein the total amount of the toner components was about 100 percent), was adjusted to 7.5 by the addition of 2 percent NaOH and the speed in the reactor was reduced to 200 rpm. After ½ hour of stirring at 53° C., the temperature in the reactor was raised to 95° C. After 1 hour of heating at 95° C., the pH of the slurry was adjusted to 4.3 and the heating was continued for an additional 5 hours. Subsequently, the reactor contents were cooled down and discharged. A 16 percent solids slurry of 5.63 micron cyan toner particles with GSDv=1.20, GSDn=1.23, GSDn$_{,50/16}$=1.24, and a ratio of GSDv/GSDn of 0.976 was obtained. The resulting toner product was comprised of about 5 percent of cyan pigment PB 15:3, about 9 percent of POLYWAX 725®, about 1 percent of SNOWTEX® colloidal silica, about 84.8 percent by weight of poly(styrene-butyl acrylate-2-carboxyethyl acrylate), and about 0.2 percent of PAC, and wherein the total amount of the toner components was about 100 percent. The resulting toner particles were washed with deionized water five times.

EXAMPLE III 5.8 Micron Cyan Toner Particles: PAC A/C Process:

The polymer latex of Latex Example III (EP208) above was utilized in an aggregation/coalescence process to produce 5.8 micron (volume average diameter) particles with a narrow size distribution.

500 Grams of deionized water were placed in a stainless steel beaker and homogenized at 5,000 rpm, while 300 grams of the above prepared latex EP208 were added; 37.16 grams of polyethylene wax POLYWAX 725® dispersion and 5.7 grams of SNOWTEX® colloidal silica dispersion (21 percent active, available from Nissan Chemical) were added followed by the addition of 31.6 grams of the PB 15:3 cyan pigment dispersion (17 percent active, available from Sun Chemicals) diluted with 110 grams of deionized water. To the resulting homogenized latex/pigment blend, 2.4 grams of 10 percent PAC solution diluted with 24 grams of 0.02 N HNO$_3$ were added dropwise causing a flocculation of the cyan pigment, 5 percent by weight, the POLYWAX 725®, 9 percent by weight, the SNOWTEX® colloidal silica, 1 percent by weight, the resin, 84.8 weight percent, and 0.2 weight percent of the PAC. After the addition was complete, homogenization was continued for an additional 2 minutes to form a creamy blend with an average particle diameter size by volume of 2.83, and a GSDv of 1.21. The creamy blend was then transferred into a 2 liter glass reactor and stirred at 350 rpm, while being heated to about 52° C. to about 53° C. Particle growth was monitored during heating. When the particle size by volume was equal to 5.71 (GSDv=1.20), the pH of the slurry (the slurry was comprised of about 16 weight percent of toner and of about 84 weight percent of water; the toner was comprised of about 5 percent of cyan pigment PB 15:3, about 9 percent of POLYWAX 725®, about 1 percent of SNOWTEX® colloidal silica, about 84.8 percent by weight of poly(styrene-butyl acrylate-2-carboxyethyl acrylate), and about 0.2 percent of PAC, and wherein the total amount of the toner components was about 100 percent) was adjusted to 7.5 by the addition of 2 percent NaOH and the speed in the reactor was reduced to 200 rpm. After ½ hour of stirring at 53° C., the temperature in the reactor was raised to 95° C. After 1 hour of heating at 95° C., the pH of the slurry was adjusted to 4.3 and the heating was continued for an additional 5 hours. Subsequently, the reactor contents were cooled down and discharged. A 16 percent solids slurry of 5.81 micron cyan toner particles with GSDv=1.19, GSDn=1.22, GSDn$_{,50/16}$=1.25, and a ratio of GSDv/GSDn of 0.975 was obtained. The resulting toner that was the above final toner product was comprised of about 5 percent of cyan pigment PB 15:3, about 9 percent of POLYWAX 725®, about 1 percent of SNOWTEX® colloidal silica, about 84.8 percent by weight of poly(styrene-butyl acrylate-2-carboxyethyl acrylate), and about 0.2 percent of PAC, and wherein the total amount of the toner components was about 100 percent. The toner particles were washed with deionized water five times.

EXAMPLE IV 5.6 Micron Magenta Toner Particles: PAC A/C Process:

The polymer latex of Latex Example IV (EP210) above was utilized in an aggregation/coalescence process to produce 5.6 micron (volume average diameter) particles with a narrow size distribution.

500 Grams of deionized water were placed in a stainless steel beaker and homogenized at 5,000 rpm, while 300 grams of latex EP210 were added, while 37.16 grams of polyethylene wax POLYWAX 725® dispersion and 5.7 grams of SNOWTEX® colloidal silica dispersion (21 percent active, available from Nissan Chemical) were added followed by the addition of 54 grams of the PR122 magenta pigment dispersion (17 percent active, available from Sun Chemicals) diluted with 110 grams of deionized water. To this homogenized latex/pigment blend, 2.4 grams of 10 percent PAC solution diluted with 24 grams of 0.02 N HNO$_3$ were added dropwise to cause a flocculation of the PR122 magenta pigment, 8 percent by weight, the POLYWAX 725®, 9 percent by weight, the SNOWTEX® colloidal silica, 1 percent by weight, the resin, 81.8 weight percent, and 0.2 weight percent of the PAC. After the addition was complete, homogenization was continued for an additional 2 minutes to form a creamy blend with an average particle diameter size by volume of 2.83, and a GSDv of 1.24. The creamy blend was then transferred into a 2 liter glass reactor and stirred at 350 rpm, while being heated to about 52° C. to about 53° C. Particle growth was monitored during heating. When the particle size by volume was equal to 5.61 (GSDv=1.22), the pH of the slurry (slurry was comprised of about 16 weight percent of toner and of about 84 weight percent of water; the toner was comprised of about 8 percent of magenta pigment PR122, about 9 percent of POLYWAX 725®, about 1 percent of SNOWTEX® colloidal silica, and about 81.8 percent by weight of poly(styrene-butyl acrylate-2-carboxyethyl acrylate), and 0.2 weight percent of PAC, and wherein the total amount of the toner components was about 100 percent) was adjusted to 7.5 by the addition of 2 percent NaOH and the speed in the reactor was reduced to 200 rpm. After ½ hour of stirring at 53° C., the temperature in the reactor was increased to 95° C. After 1 hour of heating at 95° C., the pH of the-slurry was adjusted to 4.3 and the heating was continued for an additional 5 hours. Thereafter, the reactor contents were cooled down to room temperature, about 22° C. to about 25° C. throughout the Examples, and the contents were discharged. A 16 percent solids slurry of 5.63 micron yellow toner particles with GSDv=1.22, GSDn=1.25, GSDn$_{,50/16}$=1.26, and a ratio of GSDv/GSDn of 0.976 was obtained. The resulting toner, that was the above final toner product, was comprised of about 8 percent of magenta pigment PR122, about 9 percent of POLYWAX 725®, about 1 percent of SNOWTEX® colloidal silica, and about 81.8 percent by weight of poly(styrene-butyl acrylate-2-carboxyethyl acrylate), and 0.2 weight percent of PAC, and wherein the total amount of the toner components was about 100 percent. The toner particles were washed with deionized water five times.

EXAMPLE V 5.6 Micron Yellow Toner Particles: PAC A/C Process:

The polymer latex of Latex Example V (EP211) above was utilized in an aggregation/coalescence process to produce 5.6 micron (volume average diameter) particles with a narrow size distribution.

500 Grams of deionized water were placed in a stainless steel beaker and homogenized at 5,000 rpm, while 300 grams latex EP211 were added, while 37.16 grams of polyethylene wax POLYWAX 725® dispersion and 5.7 grams of SNOWTEX® colloidal silica dispersion (21 percent active, available from Nissan Chemical) were added followed by the addition of 39 grams of PY74 yellow pigment dispersion (17 percent active, available from Sun Chemicals) diluted with 110 grams of deionized water. To this homogenized latex/pigment blend, 2.4 grams of a 10 percent PAC solution diluted with 24 grams of 0.02 N $HNO_3$ were added dropwise to cause a flocculation of the PY74 yellow pigment, 6 percent by weight, the POLYWAX 725®, 9 percent by weight, the SNOWTEX® colloidal silica, 1 percent by weight, the resin, 83.8 weight percent, and 0.2 weight percent of the PAC. After the addition was complete, homogenization was continued for an additional 2 minutes to form a creamy blend with an average particle diameter size by volume of 2.78, and a GSDv of 1.20. The creamy blend was then transferred into a 2 liter glass reactor and stirred at 350 rpm, while being heated to about 52° C. to about 53° C. Particle growth was monitored during heating. When the particle size by volume was equal to 5.39 (GSDv=1.20), the pH of the slurry (slurry was comprised of about 16 weight percent of toner and of about 84 weight percent of water; the toner was comprised of about 6 percent of yellow pigment PY74, about 9 percent of POLYWAX 725®, about 1 percent of SNOWTEX® colloidal silica, about 83.8 percent by weight of the above latex resin poly(styrene-butyl acrylate-2-carboxyethyl acrylate), and 0.2 weight percent of PAC, and wherein the total amount of the toner components was about 100 percent) was adjusted to 7.5 by the addition of 2 percent NaOH and the speed in the reactor was reduced to 200 rpm. After ½ hour of stirring at 53° C., the temperature in the reactor was raised to 95° C. Subsequent to 1 hour of heating at 95° C., the pH of the slurry was adjusted to 4.3 and the heating was continued for an additional 5 hours. Subsequently, the reactor contents were cooled down to room temperature and the contents are discharged. A 16 percent solids slurry of 5.58 micron yellow toner particles with GSD=1.19, GSDn=1.22, $GSDn_{50/16}$=1.23, and a ratio of GSDv/GSDn of 0.975 was obtained. The resulting toner, that was the above final toner product, was comprised of about 6 percent of yellow pigment PY74, about 9 percent of POLYWAX 725®, about 1 percent of SNOWTEX® colloidal silica, and about 83.8 percent by weight of the above latex resin poly(styrene-butyl acrylate-2-carboxyethyl acrylate), and 0.2 weight percent of PAC, and wherein the total amount of the toner components was about 100 percent. The toner particles were washed with deionized water five times.

COMPARATIVE EXAMPLE 1

5.6 Micron Black Toner Particles: PAC A/C:

The polymer latex of Comparative Latex Example I (EP213) above was utilized in an aggregation/coalescence process to produce 5.6 micron (volume average diameter) toner particles with a narrow size distribution.

500 Grams of deionized water were placed in a stainless steel beaker and homogenized at 5,000 rpm, while 300 grams of latex EP213 were added, while 37.16 grams of polyethylene wax POLYWAX 725® dispersion (31 percent active, available from Baker-Petrolite Company) were added followed by the addition of 38.3 grams of the REGAL 330™ black pigment dispersion (17 percent active, available from Sun Chemicals) diluted with 110 grams of deionized water. To the resulting homogenized latex/pigment blend, 2.4 grams of 10 percent PAC solution diluted with 24 grams of 0.02N $HNO_3$ were added dropwise to cause a flocculation of the black pigment REGAL 330™ carbon black, 6 percent by weight, the POLYWAX 725®, 9 percent by weight, the resin, 84.88 weight percent, and 0.12 weight percent of the PAC. After the addition was complete, homogenization was continued for an additional 2 minutes to form a creamy blend with an average particle size by volume of 2.56 and with a GSDv of 1.23. The creamy blend was then transferred into a 2 liter glass reactor and stirred at 350 rpm, while being heated to about 52° C. to about 53° C. Particle growth was monitored during heating. When the particle size diameter by volume was equal to 5.39 (GSDv=1.23), the pH of the slurry (slurry was comprised of about 16 weight percent of toner and of about 84 weight percent of water; the toner was comprised of about 6 percent of black pigment REGAL 330™, about 9 percent of POLYWAX 725®, about 0.2 weight percent of PAC, and about 84.8 percent by weight of the resin poly(styrene-butyl acrylate-2-carboxyethyl acrylate), and wherein the total amount of the toner components was about 100 percent) was adjusted to 7.5 by the addition of 2 percent NaOH and the speed in the reactor was reduced to 200 rpm. After ½ hour of stirring at 53° C., the temperature in the reactor was raised to 95° C. After 1 hour of heating at 95° C., the pH of the slurry was adjusted to 4.2 and the heating was continued for an additional 5 hours. Thereafter, the reactor content was cooled down to about room temperature throughout the Examples, about 23° C. to about 25° C., and was discharged. A 16 percent solids slurry of 5.74 micron black toner particles with GSDv=1.24, GSDn=1.37, $GSDn_{50/16}$=1.48, and a ratio of GSDv/GSDn of 0.905 was obtained. The resulting toner, that was the above final toner product, was comprised of about 6 percent of black pigment REGAL $_{330}$®, about 9 percent of POLYWAX 725®, about 0.2 weight percent of PAC, and about 84.8 percent by weight of the resin poly(styrene-butyl acrylate-2-carboxyethyl acrylate), and wherein the total amount of the toner components was about 100 percent. The toner particles were then washed with deionized water five times.

COMPARATIVE EXAMPLE 2

5.6 Micron Yellow Toner Particles: PAC A/C:

The polymer latex of Comparative Latex Example II (EP217) above was utilized in an aggregation/coalescence process to produce 5.6 micron (volume average diameter) toner particles with a narrow size distribution.

500 Grams of deionized water were placed in a stainless steel beaker and homogenized at 5,000 rpm, while 300 grams of latex EP217 were added, while 37.16 grams of polyethylene wax POLYWAX 725® dispersion and 5.7 grams of SNOWTEX® colloidal silica dispersion (21 percent active, available from Nissan Chemical) were added followed by the addition of 39 grams of PY74 yellow pigment dispersion (17 percent active, available from Sun Chemicals) diluted with 110 grams of deionized water. To this homogenized latex/pigment blend, 2.4 grams of a 10 percent PAC solution diluted with 24 grams of 0.02 N $HNO_3$ were added dropwise to cause a flocculation of the PY74 yellow pigment, 6 percent by weight, the POLYWAX 725®, 9 percent by weight, the SNOWTEX® colloidal silica, 1 percent by weight, the resin, 83.8 weight percent, and 0.2 weight percent of the PAC. After the addition was complete, homogenization was continued for an additional 2 minutes to form a creamy blend with an average particle diameter size by volume of 2.87, and a GSDv of 1.21. The creamy blend was then transferred into a 2 liter glass reactor and stirred at 350 rpm, while being heated to about 52° C. to about 53° C. Particle growth was monitored during heating. When the particle size by volume was equal to 5.42 (GSDv=1.21), the pH of the slurry (slurry was comprised of about 16 weight percent of toner and of about 84 weight percent of water; the toner was comprised of about 6 percent of yellow pigment PY74, about 9 percent of POLYWAX 725®, about 1 percent of SNOWTEX® colloidal silica, and about 83.8 percent by weight of the above latex resin poly(styrene-butyl acrylate-2-carboxyethyl acrylate), and 0.2 weight percent of PAC, and wherein the total amount of the toner components was about 100 percent) was adjusted to 7.5 by the addition of 2 percent NaOH and the speed in the reactor was reduced to 200 rpm. After ½ hour of stirring at 53° C., the temperature in the reactor was raised to 95° C. Subsequent to 1 hour of heating at 95° C., the pH of the slurry was adjusted to 4.3 and the heating was continued for an additional 5 hours. Subsequently, the reactor contents were cooled down to room temperature and the contents were discharged. A 16 percent solids slurry of 5.65 micron yellow toner particles with GSDv=1.20, GSDn=1.23, $GSDn_{50/16}$=1.24, and a ratio of GSDv/GSDn of 0.976 was obtained. The resulting toner, that was the above final toner product, was comprised of about 6 percent of yellow pigment PY74, about 9 percent of POLYWAX 725®, about 1 percent of SNOWTEX colloidal silica, and about 83.8 percent by weight of the above latex resin poly(styrene-butyl acrylate-2-carboxyethyl acrylate), and 0.2 weight percent of PAC, and wherein the total amount of the toner components was about 100 percent. The toner particles were washed with deionized water five times.

COMPARATIVE EXAMPLE 3

5.6 Micron Black Toner Particles: PAC A/C:

The polymer latex of Comparative Latex Example III (EP212) above was utilized in an aggregation/coalescence process to produce 5.6 micron (volume average diameter) toner particles with a narrow size distribution.

500 Grams of deionized water were placed in a stainless steel beaker and homogenized at 5,000 rpm, while 300 grams of latex EP212 were added, while 37.16 grams of polyethylene wax POLYWAX 725® dispersion (31 percent active, available from Baker-Petrolite Company) were added followed by the addition of 38.3 grams of the REGAL 330™ black pigment dispersion (17 percent active, available from Sun Chemicals) diluted with 110 grams of deionized water. To the resulting homogenized latex/pigment blend, 2.4 grams of 10 percent PAC solution diluted with 24 grams of 0.02N $HNO_3$ were added dropwise to cause a flocculation of the black pigment REGAL 330™ carbon black pigment, 6 percent by weight, the POLYWAX 725®, 9 percent by weight, the resin, 84.88 weight percent, and 0.12 weight percent of the PAC. After the addition was complete, homogenization was continued for an additional 2 minutes to form a creamy blend with an average particle size by volume of 2.59 and with a GSDv of 1.22. The creamy blend was then transferred into a 2 liter glass reactor and stirred at 350 rpm, while being heated to about 52° C. to about 53° C. Particle growth was monitored during heating. When the particle size diameter by volume was equal to 5.47 (GSDv=1.21), the pH of the slurry (slurry was comprised of about 16 weight percent of toner and of about 84 weight percent of water; the toner was comprised of about 6 percent of black pigment REGAL 330™, about 9 percent of POLYWAX 725®, about 0.2 weight percent of PAC, and about 84.8 percent by weight of the resin poly(styrene-butyl acrylate-2-carboxyethyl acrylate), and wherein the total amount of the toner components was about 100 percent) was adjusted to 7.5 by the addition of 2 percent NaOH, and the speed in the reactor was reduced to 200 rpm. After ½ hour of stirring at 53° C., the temperature in the reactor was raised to 95° C. After 1 hour of heating at 95° C., the pH of the slurry was adjusted to 4.2 and the heating was continued for an additional 5 hours. Thereafter, the reactor content was cooled down to about room temperature throughout the Examples, about 23° C. to about 25° C., and was discharged. A 16 percent solids slurry of 5.64 micron black toner particles with GSDv=1.20, GSDn=1.23, $GSDn_{50/16}$=1.24, and a ratio of GSDv/GSDn of 0.976 was obtained. The resulting toner, that was the above final toner product, was comprised of about 6 percent of black pigment REGAL 330™, about 9 percent of POLYWAX 725®, about 0.2 weight percent of PAC, and about 84.8 percent by weight of the resin poly(styrene-butyl acrylate-2-carboxyethyl acrylate), and wherein the total amount of the toner components was about 100 percent. The toner particles were then washed with deionized water five times.

COMPARATIVE EXAMPLE 4

5.6 Micron Cyan Toner Particles by PAC A/C Process:

The polymer latex of Comparative Latex Example IV (EP215) above was utilized in an aggregation/coalescence process to produce 5.6 micron (volume average diameter) particles with a narrow size distribution.

500 Grams of deionized water were placed in a stainless steel beaker and homogenized at 5,000 rpm, while 300 grams of the above prepared latex EP215 were added, while 37.16 grams of polyethylene wax POLYWAX 725® dispersion and 5.7 grams of SNOWTEX® colloidal silica dispersion (21 percent active, available from Nissan Chemical) were added followed by the addition of 31.6 grams of the PB 15:3 cyan pigment dispersion (17 percent active, available from Sun Chemicals) diluted with 110 grams of deionized water. To the resulting homogenized latex/pigment blend, 2.4 grams of 10 percent PAC solution diluted with 24 grams of 0.02 N $HNO_3$ were added dropwise to cause a flocculation of the cyan pigment, 5 percent by weight, the POLYWAX 725®, 9 percent by weight, the SNOWTEX® colloidal silica, 1 percent by weight, the resin, 84.8 weight percent, and 0.2 weight percent of the PAC. After the addition was complete, homogenization was continued for an additional 2 minutes to form a creamy blend with an average particle diameter size by volume of 2.76, and a GSDv of 1.23. The creamy blend was then transferred into a 2 liter glass reactor and stirred at 350 rpm, while being heated to about 52° C. to about 53° C. Particle growth was monitored during heating. When the particle size by volume was equal to 5.60 (GSDv=1.22), the pH of the slurry (slurry was comprised of about 16 weight percent of toner and of about 84 weight percent of water; the toner was comprised of about 5 percent of cyan pigment PB 15:3, about 9 percent of POLYWAX 725®, about 1 percent of SNOWTEX® colloidal silica, about 84.8 percent by weight of poly(styrene-butyl acrylate-2-carboxyethyl acrylate), and about 0.2 percent of PAC, and wherein the total amount of the toner components was about 100 percent) was adjusted to 7.5 by the addition of 2 percent NaOH and the speed in the reactor was reduced to 200 rpm. After ½ hour of stirring at 53° C., the temperature in the reactor was raised to 95° C. After 1 hour of heating at 95° C., the pH of the slurry was adjusted to 4.3 and the heating was continued for an additional 5 hours. Subsequently, the reactor contents were cooled down and discharged. A 16 percent solids slurry of 5.64 micron cyan toner particles with GSDv=1.21, GSDn=1.24, GSDn$_{50/16}$=1.25, and a ratio of GSDv/GSDn of 0.976 was obtained. The resulting toner, that was the above final toner product, was comprised of about 5 percent of cyan pigment PB 15:3, about 9 percent of POLYWAX 725®, about 1 percent of SNOWTEX® colloidal silica, about 84.8 percent by weight of poly(styrene-butyl acrylate-2-carboxyethyl acrylate), and about 0.2 percent of PAC, and wherein the total amount of the toner components was about 100 percent. The toner particles were then washed with deionized water five times.

Toner Fusing and Stripping Evaluations:

Standard fusing properties of the above prepared toner compositions were evaluated throughout as follows. Unfused images of toner on paper with a controlled toner mass per unit area of 0.43 milligram/cm$^2$ were produced by one of a number of methods. A suitable electrophotographic developer was generated by mixing from 2 to 10 percent by weight of the toner with a suitable electrophotographic carrier, such as, for example, a 65 micron Hoeganaes steel core, spray coated with 0.5 weight percent of a terpolymer of poly(methyl methacrylate), styrene, and vinyltriethoxysilane, and roll milling the mixture for 10 to 30 minutes to achieve a triboelectrical charge of between −5 to −20 microcoulombs per gram of toner as measured by the known Faraday Cage process. The developer was introduced into a small electrophotographic copier, such as the Xerox Corporation 2240, in which the fuser system had been disconnected. Between 20 to 50 unfused images of a test pattern of a 65 millimeter by 65 millimeter square solid area were produced on 8.5 by 11 inch sheets of a typical electrophotographic paper such as Xerox Corporation Image LX paper.

The unfused images were then fused by feeding them through a hot roll fuser consisting of a fuser roll and pressure roll with elastomer surfaces, both of which were heated to a controlled temperature. Fused images were produced over a range of hot roll fusing temperatures from about 130° C. to about 210° C. The gloss of the fused images was measured according to TAPPI Standard T480 at a 75° angle of incidence and reflection using a Novo-Gloss Statistical Gloss Meter, Model GL-NG 1002S from Paul N. Gardner Company, Inc. The degree of permanence of the fused images was evaluated by the Crease Test (crease test data can be expressed as MFT). The fused images were folded under a specific weight with the toner image to the inside of the fold. The image was then unfolded and any loose toner wiped from the resulting crease with a cotton swab. The average width of the paper substrate, which shows through the fused toner image in the vicinity of the crease, was measured with a custom built image analysis system.

The degree of permanence of the fused images was also characterized by the hot offset temperature (data can be expressed as HOT). When the heating is excessive, the complex viscosity of the toner (The complex viscosity is the sum of the storage elastic modulus and the loss elastic modulus divided by the measuring frequency. The complex viscosity was measured by the known sinusoidal wave oscillation method at a frequency of 6 rad/second) was lower than about $5 \times 10^2$ Pas, as measured by a sinusoidal wave oscillation method at a frequency of 6 rad/second and at the test temperature of from about 100° C. to about 250° C. At about 11 weight percent of the fused toner the fixing layer can adhere on the side of the fuser roll to cause undesirable hot offset. Typically, a resin having a large molecular weight (of about higher than 35,000) can be used to prevent the hot offset due to excessive melting.

The fusing performance of a toner was traditionally judged from the fusing temperatures required to achieve acceptable image gloss and fix. For high quality black applications, an image gloss greater than about 25 gloss units was preferred. For high quality color applications, an image gloss greater than about 35 gloss units was preferred. Similarly, the minimum fuser temperature required to produce a crease value less than the maximum acceptable crease was known as the Minimum Fix Temperature (MFT) for a given toner. In general, it was desirable to have an MFT as low as possible, such as for example MFT of below about 170° C., and preferably below 160° C. in order to primarily minimize the power requirements of the hot roll fuser. It may also be desirable to arrive at a hot offset temperature (HOT) higher than, for example, about 200° C., and preferably higher than about 210° C., such as 220° C., to ensure that toner does not adhere to a fixing fixture and to minimize/prevent hot offset.

The stripping (peelability) performance of a toner after fusing can be evaluated by the stripping force required to achieve acceptable stripping of fused toner substrate from fuser roll. In oilless fixing, typically in xerographic fusing, silicon or mercaptan oils are used to assist toner substrate release from fuser roll. The term "oilless" refers, for example, to the use of no oil to assist substrate release, the stripping of the toner from the fixing roll generally depends on the stringiness of the molten toner. Stringiness is one of the properties characteristic of a toner resin molecular structure, such as the properties of resin molecular weight and polymer chain entanglement. As stringiness increases, stripping during oilless fixing worsens or decreases, that is for example the required stripping force required will increase, and thus the stripping force required for stripping was increased. Stripping force was measured by using a remodeled version of a Color 645 Stripping Force Fixture (produced by Fuji Xerox) of fused toner on Fuji Xerox S paper with a controlled toner mass per unit area of 1.35 milligram/cm$^2$ with the fixing rate being predetermined to 200 millimeters/second, the carried amount of toner being predetermined to 4.5 gram/m$^2$, 9 grams/m$^2$ and 13.5 grams/m$^2$, and the fixing temperature being predetermined to 160° C., 180° C., and 200° C. The toner was peeled without any resistance regardless of the carried amount of the toner. In general, it was desirable to have a low stripping force, such as for example, a stripping force equal to or below 25 gf (gram-force; gram-cm/sec$^2$), and more specifically, below 20 gf in order to achieve a fixed image with a high surface gloss and with no or minimal high temperature offset.

TABLE 1

Fusing and Stripping Evaluation of Toner Particles

| | Example | | | | | Comparative 1 | Comparative 2 | Comparative 3 | Comparative 4 |
|---|---|---|---|---|---|---|---|---|---|
| | I | II | III | IV | V | | | | |
| Latex $M_w$ | 33,200 | 33,900 | 33,600 | 33,600 | 35,700 | 32,900 | 33,200 | 58,200 | 19,700 |
| Latex $M_n$ | 10,400 | 11,300 | 11,400 | 10,500 | 11,000 | 11,700 | 11,100 | 18,400 | 4,300 |
| Latex Tg (° C.) | 50.7 | 51.4 | 51.3 | 51.7 | 51.0 | 50.3 | 53.2 | 50.1 | 50.5 |
| Latex Average Size (nm) | 222 | 227 | 226 | 244 | 193 | 175 | 247 | 239 | 186 |
| Latex Viscosity (cps) (shear rate 1/sec) | 17.26 | 19.15 | 18.79 | 16.91 | 27.17 | 58.35 | 28.41 | 16.47 | 20.62 |
| Latex Static Yield Stress (dyne/cm$^2$) | 0.5 | 0.6 | 0.5 | 0.4 | 1.0 | 3.5 | 1.0 | 1.2 | 0.6 |
| Latex Gel Content (wt percent) | 2.5 | 1.4 | 1.4 | 1.0 | 1.2 | 2.1 | 6.3 | 3.0 | 1.2 |
| Latex MFI (g/10-min @ 130° C., 2.2 Kg) | 34.9 | 35.0 | 34.9 | 35.5 | 34.9 | 32.9 | 17.9 | 29.1 | 38.0 |
| Latex $M_c$ | 23,000 | 30,000 | 35,000 | 59,000 | 39,000 | 24,400 | 11,000 | 21,000 | 35,000 |
| Latex $M_e$ (×10$^{-8}$/K-mole) | 6.2 | 5.1 | 5.0 | 4.6 | 4.9 | 5.5 | 33.0 | 7.1 | 4.7 |
| Toner GSDv | 1.19 | 1.20 | 1.19 | 1.22 | 1.19 | 1.24 | 1.20 | 1.20 | 1.21 |
| Toner GSDn | 1.22 | 1.23 | 1.22 | 1.25 | 1.22 | 1.37 | 1.23 | 1.23 | 1.24 |
| Toner GSDn,$_{50/16}$ | 1.25 | 1.24 | 1.25 | 1.26 | 1.23 | 1.48 | 1.24 | 1.24 | 1.25 |
| Toner GSDv/GSDn | 0.975 | 0.976 | 0.975 | 0.976 | 0.976 | 0.905 | 0.976 | 0.976 | 0.976 |
| MFT (° C.) | 152 | 128 | 130 | 135 | 120 | 132 | 176 | 169 | 140 |
| HOT (° C.) | 210 | 210 | 210 | 220 | 220 | 220 | 220 | 220 | 185 |
| Stripping Force (gf) | 9.1 | 10.3 | 8.8 | 9.4 | 10.5 | 9.5 | 5.2 | 7.5 | 31.4 |
| Gloss (ggu) | 35 | 37 | 35 | 45 | 42 | 35 | 17 | 20 | 36 |

The particle size evaluation of the toners in Examples I to V, and Comparative Examples 1 to 4 is summarized in Table 1. As shown in the Table, it was found that a toner latex polymer dispersion with controlled static yield stress of from about 0.05 to about 3 dyne/cm$^2$, a viscosity for the polymer latex of from about 5 to about 35 centipoises (cps), toner product produced by aggregation and coalescence processes possesses a volume average particle size distribution index GSDv of equal to or less than about 1.27, a number average particle size distribution index GSDn of equal to or less than 1.30, a low number average particle size index GSDn 50/16 of equal to about or less than about 1.32, and a ratio of the volume average particle size distribution index GSDv to a number average particle size distribution index GSDn of from about 0.93 to about 1.00. In Comparative Example 1, when the static yield stress exceeded 3 dyne/cm$^2$, a viscosity for the polymer latex exceeded 35 centipoises (cps), the toner particle size distribution was deteriorated. In Comparative Example 1, the toner's number average particle size distribution index GSDn was higher than 1.30, a low number average particle size index GSDn 50/16 was higher than 1.32, and a ratio of the volume average particle size distribution index GSDv to a number average particle size distribution index GSDn was less than 0.93.

The fusing, stripping, and particle size evaluation of the toners in Examples I to V, and Comparative Examples 1 to 4 is summarized in Table 1. As shown in the Table, a toner polymer resin with controlled gel content of the polymer latex of from about 0.5 to about 4.5 weight percent, a polymer melt flow index (MFI) of from about 20 to about 45 grams/10 minutes at about 130° C., the crosslinking molecular weight $M_c$ of the polymer being from about 12,000 to about 200,000, and the crosslinking density, $M_e$ of the polymer being from about 1.2×10$^{-9}$ to about 2×10$^{-7}$/Kmole, the temperature dependence of stripping during oil less fixing can be suppressed, making it possible to provide a toner with excellent surface gloss for the fixed images, OHP transparency (transparency for overhead projector, such as Xerox 3R6218) and bending resistance of fixed image. Also, the toner stripping (peelability) and fixing property at a high temperature, that is HOT, and the surface gloss can be ensured. In Comparative Example 2, when gel content of the polymer latex exceeded 4.5 weight percent, a polymer melt flow index (MFI) was less than 20 grams/10 minutes at about 130° C., the crosslinking molecular weight $M_c$ of the polymer was less than 12,000, and the crosslinking density, $M_e$ of the polymer exceeded $2\times10^{-7}$/Kmole, the toner gloss and fixing properties at a low temperature was deteriorated. In Comparative Example 2, the toner's gloss was less than 25 ggu, and MFT was higher than 176° C.

The fusing, stripping, and particle size evaluation of the toners in Examples I to V, and Comparative Examples 1 to 4 is summarized in Table 1. As shown in the Table, a toner polymer resin with controlled weight average molecular weight $M_w$ of the polymer latex of from about 20,000 to about 55,000, a number average molecular weight $M_n$ of the polymer latex of from about 5,000 to about 18,000, an onset glass transition temperature Tg of from about 40 to about 80° C., a particle size distribution PSD of from about 50 to about 500 nanometers, the temperature dependence of stripping during oilless fixing can be suppressed, thus enabling toner developed image with excellent surface gloss for the fixed images, OHP transparency (transparency for overhead projector, such as Xerox 3R6218) and bending resistance of fixed image. Also, the toner stripping (peelability) and fixing property at a high temperature, that is HOT, and the surface gloss can be ensured. In Comparative Example 3, when $M_w$ exceeded 55,000, and $M_n$ exceeded 18,000, the toner gloss and fixing properties at a low temperature of from about 100° C. to about 180° C. was deteriorated. In Comparative Example 3, the toner's gloss was less than 25 ggu, and MFT was higher than 169° C. In Comparative Example 4, when $M_w$ was less than 20,000, $M_n$ was less than 5,000, generation of hot offset at a high temperature of about 195° C. and increase in stripping force associated thereto can result. This was shown by Comparative Example 4, where the toner's stripping force was higher than 25 gf, and HOT was below 200° C. This toner, when fused, needed higher stripping force to be peeled off from a fuser roll. Also, this toner had a hot offset temperature (HOT) of 185° C., thus the fused toner tended to adhere to the fixing fixture at lower temperature of about 195° C. It was desirable to have a toner HOT higher than about 195° C., and preferably higher than 210° C., such as from about 210° C. to about 250° C. to, for example, prevent hot offset.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A toner process comprising mixing a colorant dispersion with a latex, a wax dispersion, and a single coagulant to form a mixture, wherein the coagulant is a polymetal halide, and wherein the polymer latex selected possesses a weight average molecular weight of from about 20,000 to about 55,000, a number average molecular weight of from about 5,000 to about 18,000, an onset glass transition temperature Tg of from about 40° C. to about 80° C., and a particle size distribution PSD of from about 50 to about 500 nanometers;
   heating the mixture at a first temperature which is below the glass transition temperature of the latex to bring about aggregation;
   heating the mixture at a second temperature which is above the glass transition temperature of the latex to enable coalescence;
   lowering the pH of the mixture from about 9 to from 5 to 6.5 by the addition of an acid, wherein the acid is nitric, sulphuric, hydrochloric, citric, or acetic acid; and
   cooling the mixture to about room temperature.

2. A process in accordance with claim 1 wherein said weight average molecular weight is from about 25,000 to about 45,000.

3. A process in accordance with claim 1 wherein said weight average molecular weight is from about 28,000 to about 40,000.

4. A process in accordance with claim 3 wherein said number average molecular weight is from about 8,000 to about 13,000.

5. A process in accordance with claim 4 wherein said particle size distribution PSD is from about 190 to about 260 nanometers.

6. A process in accordance with claim 1 wherein said weight average molecular weight is from about 28,000 to about 37,000.

7. A process in accordance with claim 6 wherein said number average molecular weight is from about 9,000 to about 12,000.

8. A process in accordance with claim 6 wherein said particle size distribution PSD is from about 180 to about 300 nanometers.

9. A process in accordance with claim 1 wherein said number average molecular weight is from about 6,000 to about 15,000.

10. A process in accordance with claim 1 wherein said onset glass transition temperature Tg is from about 45° C. to about 70° C.

11. A process in accordance with claim 1 wherein said onset glass transition temperature Tg is from about 48 to about 60° C.

12. A process in accordance with claim 1 wherein said particle size distribution PSD is from about 70 to about 400 nanometers.

13. A process in accordance with claim 1 wherein said particle size distribution PSD is from about 100 to about 350 nanometers.

14. A process in accordance with claim 1 wherein said particle size distribution PSD is from about 150 to about 300 nanometers.

15. A process in accordance with claim 1 wherein said polymer latex selected possesses a weight average molecular weight of about 33,000, a number average molecular weight of about 11,000, an onset glass transition temperature Tg of about 51° C., and a particle size distribution PSD of about 230 nanometers.

16. A process in accordance with claim 1 wherein said first temperature is from about 40° C. to about 70° C.

17. A process in accordance with claim 1 wherein said second heating is at a temperature of from about 80° C. to about 95° C.

18. A process in accordance with claim 1 wherein said first temperature is from about 35° C. to about 50° C., and said second temperature is from about 70° C. to about 98° C.

19. A process in accordance with claim 1 wherein the toner possesses a minimum fix temperature (MFT) of about 100° C. to about 180° C.

20. A process in accordance with claim 1 wherein the toner hot offset temperature (HOT) is from about 195° C. to about 250° C.

21. A process in accordance with claim 1 wherein said polymetal halide coagulant is a polymetal chloride.

22. A process in accordance with claim 1 wherein said polymer is selected from the group comprised of poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), poly(styrene-butyl acrylate-acrylonitrile-acrylic acid), poly(styrene-butadiene-β-carboxyethyl acrylate), poly(styrene-butadiene-acrylonitrile-β-carboxyethyl acrylate), poly(styrene-butyl acrylate-β-carboxyethyl acrylate), and poly(styrene-butyl acrylate-acrylonitrile-β-carboxyethyl acrylate).

23. A process in accordance with claim 1 wherein said polymetal halide coagulant is selected from the group consisting of a polyaluminum chloride, a polyaluminum sulfosilicate, and a polyaluminum sulfate.

24. A process in accordance with claim 1 wherein said wax is selected in an amount of from about 5 to about 20 weight percent.

25. A process in accordance with claim 1 wherein said colorant is a cyan, a magenta, a yellow, a black, or mixtures thereof.

26. A process in accordance with claim 1 wherein said colorant is a carbon black.

27. A process in accordance with claim 1 wherein said colorant is a pigment, or a dye.

28. A process in accordance with claim 1 wherein the first temperature is from about 45° C. to about 60° C., and wherein the second temperature is from about 80° C. to about 95° C., and wherein said coagulant is a polyaluminum halide.

29. A process in accordance with claim 1 wherein said latex polymer has a static yield stress of from about 0.05 to about 3 dynes per cm$^2$, and a viscosity of from about 5 to about 35 centipoises.

30. A process in accordance with claim 29 wherein the toner product possesses a volume average particle size distribution index GSDv of equal to or less than about 1.27, a number average particle size distribution index GSDn of equal to or less than about 1.30, a low number average particle size index GSDn$_{50/16}$ of equal to or less than about 1.32, and a ratio of the volume average particle size distribution index GSDv to the number average particle size distribution index GSDn of from about 0.93 to about 1.

31. A process in accordance with claim 30 wherein the viscosity of the polymer latex is at a shear rate of from about 0.1 s$^{-1}$ to about 10 s$^{-1}$ and wherein said viscosity is measured at a temperature of from about 23° C. to about 27° C.

32. A process in accordance with claim 1 wherein the latex polymer has a gel content of from about 0.5 to about 5 weight percent, a polymer melt flow index (MFI) of from about 20 to about 45 grams/10 minutes at from about 115° C. to about 145° C., a crosslinking molecular weight M$_c$ of from about 12,000 to about 200,000, and a crosslinking density M$_e$ of from about 1.2×10$^{-9}$ to about 2×10$^{-7}$/Kmole.

33. A process comprising heating a mixture of a colorant dispersion with a latex, a wax dispersion, and a single coagulant, wherein the coagulant is a polymetal halide, and wherein the polymer latex selected possesses a weight average molecular weight of from about 20,000 to about 55,000, a number average molecular weight of from about 5,000 to about 20,000, and an onset glass transition temperature Tg of from about 40° C. to about 80° C.; wherein said heating comprises a first and second heating, wherein said second heating is above the temperature of said first heating, the first heating brings about aggregation, and the second heating enables coalescence;

lowering the pH of the mixture from about 9 to from 5 to 6.5 by the addition of an acid, wherein the acid is nitric, sulphuric, hydrochloric, citric, or acetic acid; and cooling the mixture to about room temperature.

34. A process in accordance with claim 33 wherein said polymer possesses a static yield stress of from about 0.05 to about 3 dyne/cm$^2$, a viscosity of from about 5 to about 35 centipoises (cps), and wherein the toner product possesses a volume average particle size distribution index GSDv of equal to or less than about 1.27, a number average particle size distribution index GSDn of equal to or less than about 1.30, a low number average particle size index GSDn$_{50/16}$ of equal to or less than about 1.32, and a ratio of the volume average particle size distribution index GSDv to a number average particle size distribution index GSDn of from about 0.93 to about 1.

35. A toner process comprising mixing a colorant dispersion with a latex, a wax dispersion, and a polymetal halide coagulant to form a mixture, wherein the polymer latex selected possesses a weight average molecular weight of from about 20,000 to about 55,000, a number average molecular weight of from about 5,000 to about 18,000, an onset glass transition temperature Tg of from about 40° C. to about 80° C., and a particle size distribution PSD of from about 50 to about 500 nanometers, and wherein said polymer possesses a static yield stress of from about 0.05 to about 3 dynes/cm$^2$, and a viscosity of from about 5 to about 35 centipoises (cps);

heating the mixture at a first temperature which is below the glass transition temperature of the latex to bring about aggregation;

heating the mixture at a second temperature which is above the glass transition temperature of the latex to enable coalescence;

lowering the pH of the mixture from about 9 to from 5 to 6.5 by the addition of an acid, wherein the acid is nitric, sulphuric, hydrochloric, citric, or acetic acid; and cooling the mixture to about room temperature to obtain a toner product, wherein the toner product resulting possesses a volume average particle size distribution index GSDv of equal to or less than about 1.27, a number average particle size distribution index GSDn of equal to or less than about 1.30, a low number average particle size index GSDn$_{50/16}$ of equal to or less than about 1.32, and a ratio of the volume average particle size distribution index GSDv to the number average particle size distribution index GSDn of from about 0.93 to about 1.

36. A process in accordance with claim 35 wherein the toner resulting possesses a GSDv of about 1.19, a GSDn of about 1.22, a $GSDn_{50/16}$ of about 1.25, and a GSDv/GSDn ratio of about 0.975, and wherein there was selected as said coagulant a polyaluminum chloride.

37. A process in accordance with claim 35 wherein the toner resulting possesses a GSDv of about 1.20, a GSDn of about 1.23, a $GSDn_{50/16}$ of about 1.24, and a GSDv/GSDn ratio of about 0.976, and wherein there is selected as said coagulant a polyaluminum halide.

* * * * *